(12) United States Patent
Farooqi et al.

(10) Patent No.: US 11,346,756 B2
(45) Date of Patent: May 31, 2022

(54) BULK CRUSH STRENGTH TEST APPARATUS

(71) Applicant: SipChem Sahara International Petrochemical Company JSC, Al-Khobar (SA)

(72) Inventors: Mohammed Farooqi, Al-Khobar (SA); Richard Venables, Al-Khobar (SA)

(73) Assignee: SipChem Sahara International Petrochemical Company JSC, Al-Khobar (SA)

( * ) Notice: Subject to any disclaimer, the term of this patent is extended or adjusted under 35 U.S.C. 154(b) by 348 days.

(21) Appl. No.: 16/732,964

(22) Filed: Jan. 2, 2020

(65) Prior Publication Data
US 2021/0208039 A1 Jul. 8, 2021

(51) Int. Cl.
*G01N 3/08* (2006.01)
*G01N 3/02* (2006.01)
*G01N 3/04* (2006.01)

(52) U.S. Cl.
CPC .............. *G01N 3/08* (2013.01); *G01N 3/02* (2013.01)

(58) Field of Classification Search
CPC ............ G01N 3/04; G01N 2203/0076; G01N 2203/0087; G01N 2203/0284; G01N 2033/0091; G01N 33/42; G01N 2203/0085; G01N 2203/0268; G01N 33/38; G01N 33/24; G01N 2203/0254
See application file for complete search history.

(56) References Cited

U.S. PATENT DOCUMENTS

| | | | |
|---|---|---|---|
| 3,331,241 A | 7/1967 | Boonstra et al. | |
| 3,994,157 A | 11/1976 | Burk et al. | |
| 4,885,941 A | 12/1989 | Vardoulakis et al. | |
| 7,562,583 B2 | 7/2009 | Conway et al. | |
| 9,459,245 B2 * | 10/2016 | Bois | G01N 33/383 |
| 2008/0060444 A1 * | 3/2008 | Conway | G01N 3/08 73/821 |
| 2013/0340505 A1 * | 12/2013 | Go Boncan | G01N 33/383 73/38 |

FOREIGN PATENT DOCUMENTS

| | | |
|---|---|---|
| CN | 205620237 U | 10/2016 |
| EP | 1 646 857 B1 | 4/2018 |

OTHER PUBLICATIONS

"Aggregate Crushing Value Apparatus", Just Machine Tools, www.justytest.com/Aggregate-civil.html, JMT-306, IS : 9376, 2386 (Part IV), 2008, 4 pages.
"Crushing Resistance of Lightweight Aggregates", PARS Material Testing Equipment ROS, https://parsrostest.com/en/urun/crushing-resistance-of-lightweight-aggregates, Aug. 20, 2019, 3 pages.

* cited by examiner

*Primary Examiner* — Brandi N Hopkins
(74) *Attorney, Agent, or Firm* — Oblon, McClelland, Maier & Neustadt, L.L.P.

(57) ABSTRACT

An apparatus for use in testing the bulk crush characteristics of pellet materials. The apparatus constructed such that opening and closing can be conducted without complex binding and unbinding requirements. The apparatus may be used in combination with a universal testing machine fitted with compression test plates and a load cell capable of measuring force in a vertical direction.

20 Claims, 15 Drawing Sheets

BULK CRUSH STRENGTH TEST APPARATUS

BACKGROUND OF THE INVENTION

Field of the Invention

The present disclosure relates to a mechanical testing device suitable to determine bulk crush strength of solid particles, such as particulate catalysts and other pelletized materials. More particularly, the disclosure relates to a bulk crush strength apparatus that permits easier removal of a crushing (i.e., compacting or compressing) piston and corresponding sample from a sample holder after a test has been conducted.

Description of the Related Art

Pellets and pelletized materials are used in many commercial applications including pharmaceuticals, food, animal feed, catalysts, and other applications. The mechanical crush (compression) strength of pellets is an important characteristic for judging the performance, handling, and transportation of the pellets. Crush strength is the pressure that must be applied to the pellets to generate 1 wt. % fine particles, relative to the total pellet weight. The size of the fine particles, or fines, is generally defined by the application. Fines are typically determined by measuring the weight of fine particles that pass through a sieve of certain size in 60 seconds. Pellets can be produced in various shapes and sizes including cylinders, trilobed, quadra-lobed, star-shaped, spheres, spheroids, prismatic, etc., each having unique crush strength properties. Crush strength is a key parameter used in defining the physical integrity of the solid material in its respective applications.

Heterogeneous catalysts used in chemical reactor beds can fail due to mechanical loading, for example, by compressive forces in service, shipping, or handling. If the pellets fail, the efficiency of the plant or process may be reduced or an increase in the occurrence of reactor pressure drops may be caused, which could lead to a chemical plant shutdown.

Bulk crush strength can be measured using a crush cell formed in the shape of a plug inserted into a sample holder with a retaining ring, gripped by a screw through the retaining ring holds, and an access cover in place at the base of the sample holder. Typically, the piston is brought in contact with sample inside the sample holder, wherein the complete assembly is placed under a compression press. A desired pressure is applied at a selected rate for a certain period of time to obtain fine particles which are measured gravimetrically by sieving the fine particles from the pellets after crushing.

In a customary apparatus of this type, the plug used for this purpose may have a gap at a mating location which can act as a knife edge. During the crushing operation, these gaps/edges can artificially fracture the solid material and give false or inaccurate values. After conducting tests in conventional devices, removing the piston and the sample from customary sample holders can be difficult due to the piston's long length and intricate plug shape.

Improvements to known testing devices and methods have been researched in the art.

U.S. Pat. No. 7,562,583 to Conway et al. (Conway) discloses an apparatus and method for loading a cell for testing crush-resistance of a proppant or other granular material. Conway's apparatus includes a rod valve and one or two screens selected to allow proppant to pluviate into the cell. Stress may be applied to Conway's cell and the amount of proppant crushed by the stress may be measured. Screen sizes may be varied to select sizes to minimize variance of measurements. Conway's device uses three cylindrical posts/bars extending upwards in an axial direction from the base through which the upper cover is mounted, fixing the components in an axial direction. Conway's device has radially oriented tabs, protruding from the outer cylindrical surface of the top and bottom regions. While Conway has certain rods in a radial direction to hold its screen, Conway does not have a radial bar, orthogonal to the piston thrust direction, configured to affix the cell in location. Conway's apparatus also uses a spacer to avoid wear on the lower cup.

CN 205620237 U by Yang et al. (Yang) discloses an aggregate crush strength measuring instrument, including: a test cylinder, wherein the test cylinder is a hollow cylinder; a chassis comprising a bottom plate and a protrusion arranged on an outer circumference of the bottom plate; a test tube positioned on the inner side of the protrusion, wherein the protrusion limits the bottom of the test tube; a press head, wherein the bottom surface of the press head covers the test tube and is used to take out the sample, wherein the bottom of the test cylinder abuts against the sampling cylinder, and an inner diameter of the sampling cylinder is larger than an inner diameter of the testing cylinder. Yang's apparatus has a hollow test cylinder as a first part, having a handle as a radial bar attached to a plunger-like pressing head, and a bottom plate with an outer vertical lip and diagonal lip to hold a test cylinder as a second part. Yang does not describe a middle piston element, nor a locating pin which extends beyond the cylindrical perimeter of the testing device. The compression head length-to-width ratio in Yang's device is small, e.g., 1:2. Yang requires a reinforcement bar in a groove in its bottom plate to enhance the strength of its recessed portion.

U.S. Pat. No. 4,885,941 to Vardoulakis et al. (Vardoulakis) discloses a bi-axial compression test apparatus for geomaterial (soil, etc.) samples that is designed to allow free shear band formation and provide measurements of the stress displacement characteristics of the failure zone. Vardoulakis's device is a right rectangular prism wherein a geomaterial sample is surrounded by a thin rubber membrane and is supported by walls along two parallel faces. An axial load is kinematically applied by a plate guided to prevent any tilt or eccentricity, while a bottom support plate for the specimen is horizontally guided by a linear bearing that is substantially friction free. All of the surfaces that are in contact with the specimen are glass lined and lubricated to minimize friction. Vardoulakis describes an axial piston force acting on a sample used with the device, with the sample molded before being placing in the testing apparatus. A hydrostatic pressure is applied to all sides of the sample and the sliding of the bottom support plate indicates a shear failure of the specimen. Vardoulakis does not use a piston and cylinder arrangement, instead requiring a latching element on the sample forming device and threaded tie rods radially oriented on the sides.

U.S. Pat. No. 3,331,241 to Boonstra et al. (Boonstra) discloses an apparatus for carrying out crush strength determinations on pellets, having a support strip, a plurality of adhesive coated portions on the support strip, forming means for holding and carrying the pellets to be tested, a crush-strength testing means comprising a force-exerting means and a force-measuring means, and means for moving the support strip through the force-exerting means thereby bringing the pellets held by the adhesive-coated portions of the support strip into serial register with the force-exerting means. Boonstra's apparatus does not contain a three part testing cell with a fixation pin/bar orthogonal to its length (height) axis.

U.S. Pat. No. 3,994,157 to Burk et al. (Burk) discloses an apparatus and a method for determining the crush strength of pellets of a powdered material by compressing individual pellets between a pellet-contacting face on a force-exerting means and another pellet-contacting face on a force-measuring transducer. Burk's cell may contain a bar perpendicular to the axial length, but it is not a fixative component, and Burk's cell lacks a separate central piston element. In addition, Burk's cell is affixed across a measurement device housing with a thrust rod which passes through a bushing having a shoulder at the top end and a threaded nut beneath it which screws onto the bushing.

EP 1 646 857 B1 to Benea et al. (Benea) discloses a method and apparatus for measuring the crush strength of a particle-containing abrasive used in a lapping process. Benea's crush strength tester has a cup for holding the abrasive; a first motor for rotating the cup in a first direction; a piston having a face for rotatably fitting within the cup and contacting the abrasive; a second motor for rotating the piston in a second direction opposite the first direction; and a press for pressing the piston against the abrasive and crushing the particles while the first and second motors are rotating. Benea's device has only an upper and lower component to its sample container, though it has a hole extending radially at least partially through the top portion.

The Testing Instruments from Just Machine Tools (JMT) discloses a variety of testing machines, including the JMT 306 Aggregate Crushing Value Apparatus IS: 9376, 2386 (Part-IV), for measuring of resistance of aggregate to crushing, having a cylindrical container of 150±0.5 mm diameter by 130 to 140 mm height with a 200 to 230 mm$^2$ by 6 mm thick base plate, a 148±0.5 mm diameter by 100 to 115 mm high a plunger, a 16 mm diameter by 600 mm long temping rod one with end rounded, and a 115±0.5 mm diameter by 1800.5 mm high metal measure. JMT's square base plate is fixed to the cylindrical container, and JMT's top piece has a small lip to fit inside the cylinder after the sample has been loaded, while the (axial) central cylinder also has a lip/flange, i.e., has non-linearities along its outer surface along its axial length.

The ParsRos Material Testing Equipments (Pars) discloses testing equipment including an Anasayfa aggregate test machine for measuring crush strength of lightweight aggregates (Standards: TS EN 13055-1) having a cylindrical form with three screwing fixtures or locating pins on the top of the sample chamber and four clamps on the base of the device. Pars's apparatus is for the determination of the crush strength of lightweight aggregate, including a ring with adjustable height, upper and lower cylindrical pistons, and a base. Pars's base section has a flat plat with a larger radial perimeter than the remainder of its base section. Pars uses four clasps to hold the base plate onto the cylinder. Pars has three securing screws at the top of the cylinder.

In light of the above, a need remains for crush strength testing devices and methods, particularly for proppant materials and catalysts, having a simplified and/or expedited opening and closing mechanism, and methods of making such devices.

SUMMARY OF THE INVENTION

Aspects of the invention provide bulk crush test cells suitable for a universal testing machine, which cells may comprise: a base holder comprising a hollowed internal bottom space, defined by an inner wall, an internal base wall, an external base wall, and an outer wall, an outer corpus of the base holder having a first longest radial dimension (e.g., diameter); a hollow upper sample upper sample holder comprising an inner upper sample holder wall and an outer upper sample holder wall, the upper sample holder being configured to rest in the hollowed internal bottom space, the upper sample holder being non-contiguous with the base holder, an outer corpus of the upper sample holder having a second longest radial dimension (e.g., diameter); a piston, comprising a piston top surface, a piston bottom surface, and a piston outer surface, the piston being configured for insertion through the hollow upper sample upper sample holder and thereby apply pressure to a sample within the cell, an outer corpus of the piston having a third longest radial dimension (e.g., diameter); and, optionally, a locating pin configured to prevent the piston from contacting the base wall, wherein the first longest radial dimension (e.g., diameter) is greater than the second longest radial dimension (e.g., diameter), the second longest radial dimension (e.g., diameter) being greater than the third longest radial dimension (e.g., diameter), wherein the piston comprises a first radially oriented hole through which the locating pin is configured to pass from a first radial side of the piston to a second radial side of the piston, and wherein the base holder, the upper sample holder, and the piston are configured to hold together without further elements extending along a longitudinal axis between the base holder, the upper sample holder, and the piston. Inventive cells may comprise any permutation of features described herein, particularly the following.

Inventive cells may further comprise a first polymeric film arranged on the internal base wall of the base holder and/or a second polymeric film arranged on the piston bottom surface. The first polymeric film may have a lower hardness than the internal base wall. The second polymeric film has a lower hardness than the piston bottom surface.

The piston may be slidably insertable into and removable from the hollow sample upper sample holder, without rotating the piston, the sample section, or the base holder.

The piston bottom surface may surrounded on a perimeter by a lip extending longitudinally further than the piston bottom surface coextensively with the piston outer surface, and the lip may be configured to retain the second polymeric film.

Inventive cells may further comprise a second radially oriented hole, suitable to receive the locating pin, through which the locating pin is configured to pass from the first radial side of the piston to the second radial side of the piston, and the second radially oriented hole may be longitudinally displaced along the piston from the first radially oriented hole. The second radially oriented hole may be aligned linearly with the first radially oriented hole along the longitudinal axis of the piston.

Inventive cells may further comprise a third radially oriented hole, suitable to receive the locating pin, through which the locating pin is configured to pass from the first radial side of the piston to the second radial side of the piston, and the third radially oriented hole may be longitudinally displaced along the piston from the first and second radially oriented hole.

The base holder may comprise, on the inner wall, a radially inward protrusion configured to retain the first polymeric film against the internal base wall. The radially inward protrusion may be a contiguous element made of the same material as the inner wall of the base holder. The radially inward protrusion may have a constant cross-section orthogonal to the radial direction. The radially inward protrusion may have a constant cross-section orthogonal to the longitudinal axis.

The base holder, the section holder, and the piston may have circular, square, or hexagonal cross-sections orthogonal to the longitudinal axis.

The piston may have a cylindrical shape along an entire piston length.

The base holder and/or the holder section may comprise a flange, projecting radially outwardly, on an end towards the piston.

The third longest radial dimension (e.g., diameter) and an inner longest radial dimension (e.g., diameter) of the upper sample holder may be in a range of from 35 to 100 mm, and the third longest radial dimension (e.g., diameter) may be less than the inner longest radial dimension (e.g., diameter) of the upper sample holder.

The base holder, the upper sample holder, and the piston may each be cylindrical in shape and may be configured to be concentrically aligned to each other in operation.

Aspects of the invention provide methods of opening a bulk crush test cell suitable for a universal testing machine, which methods may comprise without previously or thereafter releasing a fixing element on the cell, withdrawing a piston from within a hollow upper sample holder through a top portion of the upper sample holder, a lower portion of the upper sample holder resting within a base holder, to thereby directly expose a tested material within the holding and base holders, wherein the piston comprises a piston top surface, a piston bottom surface, and a piston outer surface, wherein the piston is configured for insertion through a top portion of a hollow upper sample holder and thereby apply pressure to a sample within the cell, wherein the base section comprises a hollowed internal bottom space, defined by an inner wall, an internal base wall, an external base wall, and an outer wall, and wherein the upper sample holder comprises an inner upper sample holder wall and an outer upper sample holder wall, the upper sample holder being configured to rest in the hollowed internal bottom space, the upper sample holder being non-contiguous with the base holder. Inventive methods may include any permutation of the modifications described herein.

Inventive methods may involve the base holder, the upper sample holder, and the piston being configured to hold together without further elements extending in an axial, longitudinal direction between the base holder, the upper sample holder, and the piston.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
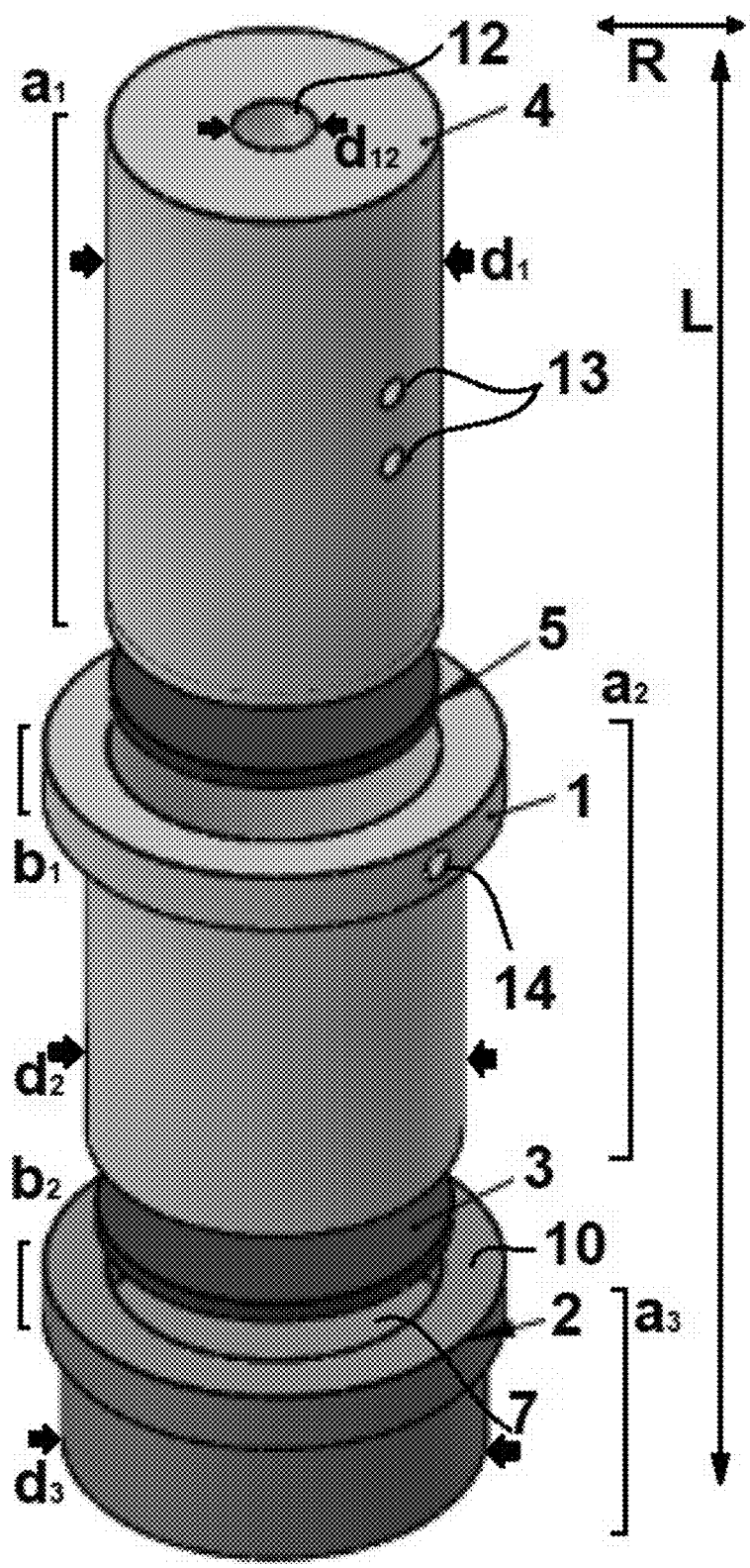
FIG. 1A shows a top, left isometric view of an exemplary crush strength test cell assembly apparatus.

Aspects of the invention provide bulk crush strength (also, crushing strength, compression strength, or compressive strength) test cells suitable for a universal testing machine (UTM), which cells may comprise: a base holder or component comprising a hollow internal bottom space, defined by an inner wall, an internal base wall, an external base wall, and an outer wall, an outer corpus of the base holder having a first longest radial dimension (e.g., diameter); a hollow upper sample holder comprising an inner upper sample holder wall and an outer upper sample holder wall, the upper sample holder being configured to rest in the hollowed internal bottom space, the upper sample holder being non-contiguous with the base holder, an outer corpus of the upper sample holder having a second longest radial dimension (e.g., diameter); a piston, comprising a piston top surface, a piston bottom surface, and a piston outer surface, the piston being configured for insertion through the upper sample holder and thereby apply pressure to a sample within the cell, an outer corpus of the piston having a third longest radial dimension (e.g., diameter); and a locating pin configured to prevent the piston from contacting the base wall.

The internal bottom space of the base holder corresponds to a volume within the base holder/component in which the upper sample holder typically rests at least partially flush, e.g., on contact points, lines, and/or strips (e.g., 2, 3, 4, 5, 6, 8, 10, 20, or more) or on the entire outer surface of the upper sample holder, thereby preventing the upper sample holder from radial translation or rattling. Therefore the longitudinal inner wall of the internal bottom space (in the base holder)

typically forms a longest radial dimension (e.g., diameter) that is, e.g., at least 0.05, 0.1, 0.25, 0.5, 0.75, 1, 1.25, 1.5, 1.75, 2, 2.5, 3, or 5% and/or up to 10, 9, 8, 7, 6, 5, 4, 3, 2.5, 2, 1.5, or 1%, larger than the longest outer radial dimension of the holder section. The longest outer and/or inner radial dimension (diameter, in the case of cylindrical shape) of the upper sample holder may be substantially constant, e.g., varying no more than 1, 0.5, 0.1, 0.05, 0.001, 0.0001%, or linear according to engineering tolerances, across the upper sample holder's longitude, ignoring any flanges present on the holder section, particularly on the upper exterior of the upper sample holder. The longest outer and/or inner radial dimension (diameter, in the case of cylindrical shape) of the base holder may be substantially constant across the base holder's longitude, ignoring any flanges present on the base holder, particularly on the upper exterior of the base holder and/or the lower region of the inner wall of the base holder. Exterior flanges on the base and/or upper sample holder may serve to stabilize the cell to radial tilting or displacements. One or more interior flanges or protruding elements in the base holder may serve to retain a sheet of material between the piston and the internal base wall in operation. The external base wall of the base holder and/or the external base of the base holder may preferably be coextensive with the outer wall of the base holder.

"Suitable for a universal testing machine (UTM)" as used herein means that inventive cells/devices are designed to dimensionally fit into a UTM, e.g., having a total height (z-axis, longitudinal axis, or axial dimension) of at least 5, 7.5, 10, 12.5, 15, 17.5, 20, 22.5, or 25 cm and/or up to 60, 55, 50, 45, 42.5, 40, 37.5, 35, 32.5, 30, 27.5, or 25 cm, and/or a width (x-axis dimension) of, e.g., at least 1, 1.5, 2, 2.5, 3, 3.5, 4, 4.5, 5, 5.5, 6, 7.5, or 10 cm and/or 20, 17.5, 15, 12.5, 10, 9, 8, 7.5, 7, 6.5, or 6 cm, and/or a depth (y-axis dimension) of, e.g., at least 1, 1.5, 2, 2.5, 3, 3.5, 4, 4.5, 5, 5.5, 6, 7.5, or 10 cm and/or 20, 17.5, 15, 12.5, 10, 9, 8, 7.5, 7, 6.5, or 6 cm. Inventive devices may include features to aid the attachment and/or retention of the test cell in the UTM, such as one or more recesses on the top of the piston. Inventive devices may be configured to withstand testing forces of, e.g., at least 1, 2, 5, 10, 15, 25, 35, or 50 kN and/or up to 500, 450, 400, 350, 300, 250, 200, 150, 125, or 100 kN. Inventive devices may be configured to accommodate standards including ASTM E4, ASTM D882, ISO 5893, ISO 7500-1, ISO 9283, ASTM D3410, ISO 8515, JIS K7076 (Method B), ASTM D3410, ISO 8515, JIS K7076 (Method B), ASTM D695, ASTM D3846, JIS K7018 (Method 1), JIS K7076 (Method A), and/or EN 1002/1-4, each of which is incorporated by reference herein in its entirety. The device can be used for ad-hoc testing of crushing of pellets or ASTM 7084. Inventive devices may be configured to conduct, e.g., standard tests, UTMs having 12 to 48" (~30 to 122 cm) vertical travel, e.g., at least 30, 30.5, 31, 32, 33.5, 35, 37.5, 40, 42.5, or 45 cm and/or up to 122, 120, 116, 110, 100, 90, 80, 70, or 60 cm. Inventive cells/devices may fit into a UTM with a single and/or dual column frame with a 16×17" (40.6×43 cm) or 23×19" (58.4×48.3 cm) footprint, e.g., at least 36, 38, 40, 42, 44, 46, 48, or 50 cm and/or up to 80, 76, 72, 68, 64, 60, 58, 56, 54, 52, or 50 cm. Inventive cells should generally fit into typical commercial compression fixtures, such as compression test jigs for composite materials, fixed compression plates (optionally spherically sealed), in-plane compression test jigs for composite materials, flat surface plates for compression tests, T-grooved surface plates for compression tests, etc.

In other aspects of suitability, when the test cell is loaded with the sample at the start of the crush test the height of the crush test cell is around 15 cm (see distance L in FIG. 1A) and this preferably fits between the faces of the upper and lower compression plates fitted to the UTM when the UTM cross-head is moved to the starting position of the test.

The diameter of the base holder (dimension d3 in FIG. 1A) should preferably be less than the diameter of the face of the lower compression plate of the UTM. The diameter of the piston (dimension d1 in FIG. 1A) should be less than the diameter of the upper compression plate of the UTM. This is to ensure that the crush cell remains securely and stably located between the compression plates during the test.

The first longest radial dimension (e.g., diameter), i.e., of outer wall of the base holder/component may be greater than the second longest radial dimension (e.g., diameter), i.e., of outer wall of the holder section/component. The second longest radial dimension (e.g., diameter), i.e., of the outer wall of the holder section/component, will generally be greater than the third longest radial dimension (e.g., diameter), i.e., of the outer wall of the piston.

The piston may comprise a first, second, third, fourth, etc., radially oriented hole (radial hole) through which the locating pin is configured to pass from a first radial side of the piston to a second radial side of the piston. The base holder, the upper sample holder, and the piston may be configured to hold together without further (fixative) elements extending along a longitudinal axis between the base holder, the upper sample holder, and the piston, and/or on a radial axis (beyond the locating pin) of any of these, such as screws, bars, hooks, clamps, bolts, etc. The piston may contain no flanges. The piston may be a solid, contiguous piece of material, or may contain a hollow space in the middle walled off from the exterior. One, two, three, four, five, six, or more radial holes may penetrate the piston, typically on an upper ⅓ or half of the piston's longitudinal length, e.g., in a range of at least 25, 30, 35, 40, 45, or 50% and/or up to 75, 70, 65, 60, 55, or 50% of the piston length. The piston may have an otherwise smooth outer surface/wall(s), beyond the radial holes. The outer diameter/longest radial dimension of the piston may be flush with or be, e.g., at least 0.05, 0.1, 0.25, 0.5, 0.75, 1, 1.25, 1.5, 1.75, 2, 2.5, 3, or 5% and/or up to 10, 9, 8, 7, 6, 5, 4, 3, 2.5, 2, 1.5, or 1%, larger than the longest inner radial dimension of the upper sample holder. The outer surface of the piston may generally be flush with the inner surface of the upper sample holder, and the outer surface of the upper sample holder may be flush with the inner surface (inner wall) of the base holder.

Inventive cells may further comprise a first polymeric film arranged on the internal base wall of the base holder and/or a second polymeric film arranged on the piston bottom surface. The first polymeric film may have a lower hardness than the internal base wall. The second polymeric film has a lower hardness than the piston bottom surface. For example, the (polymeric) material of the first and/or second disc/sheet/film may independently comprise elastomer or other polymer, such as fluoroelastomer (FKM, FFKM, tetrafluoro ethylene/propylene rubbers (FEPM), polymers of vinylidene difluoride, hexafluoropropylene, tetrafluoroethylene, perfluoro methyl vinyl ether, propylene, and/or ethylene with fluorine contents generally of from 60 to 70 wt. %, e.g., at least 60, 61, 62, 63, 64, 65, 66, 67, 68, or 69 wt. % and/or up to 70, 69, 68, 67, 66, 65, 64, 63, or 62 wt. %), polyvinyl alcohol (PVA), nitrile rubber, polyisobutylene (PIB), styrene-butadiene rubber (SBR), neoprene, natural rubber, polybutadiene, olefinic elastomers (XPE, XPE-PP, . . . ), homopolymers, copolymers, and/or terpolymers (or blends of any of these) of olefins—such as ethylene, propylene, 1-butene, isobutene, 1,3-butadiene, isoprene, and/or tetrafluoroethylene; halomonomers—such as vinylchloride, vinylidene fluoride, tetrafluoroethylene, chlorotrifluoroethylene, hexafluoropropylene oxide, perfluoro(methyl vinyl ether) ($CF_2$=$CFOCF_3$), perfluoro(ethyl vinyl ether) ($CF_2$=$CFOCF_2CF_3$); vinyl monomers—such as vinyl chloride, 2-chloroethyl vinyl ether, vinyl alcohol, vinylidene dichloride, vinylidene difluoride, and/or vinyl acetate (or other esters); polyamides—such as polymers of dodecanediamine, decanediamine, octanediamine, hexamethylenediamine, tetramethylendiamine, caprolactam, 11-aminoundecanoic, terephthalic acid, 1,5-pentanedioic acid (glutaric acid), 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedioic acid, 1,12-dodecanedioic acid, 1,13-tridecanedioic acid (brassylic acid), m-xylylenediamine, paraphenylenediamine, terephthalic acid, 1,10-decamethylendiamine, and/or dodecano-12-lactam (lauric lactam), e.g., PA 6 (or nylon 6), PA 12, PA 6,6, PA 6T, PA 1,6, PA 6,9, PA 6,12, PA 11, PA 4,6, PA 12,12, PA 10,10, etc.; polyurethanes (PU)—such as PUs comprising polycarbonate(s), polyether(s), and/or polyester(s), and/or toluene diisocyanate (TDI), methylene diphenyl diisocyanate (MDI), 1,6-hexamethylene diisocyanate (HDI), 1-isocyanato-3-isocyanatomethyl-3,5,5-trimethyl-cyclohexane (i.e., isophorone diisocyanate, IPDI), 4,4'-diisocyanato dicyclohexylmethane, ($H_{12}$MDI or hydrogenated MDI), polypropylene oxide (PPO), polyethylene oxide (PEO), poly(tetramethylene ether) glycol, dipropylene glycol, glycerine, sorbitol/water solution, ethylenediamine, triethanolamine, ethylene glycol, 1,4-butanediol (1,4-BDO), 1,6-hexanediol, cyclohexane dimethanol, hydroquinone bis(2-hydroxyethyl) ether (HQEE), ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,4-cyclohexanedimethanol, ethanolamine, diethanolamine, methyldiethanolamine, phenyldiethanolamine, glycerol, trimethylolpropane, 1,2,6-hexanetriol, triethanolamine, pentaerythritol, N,N,N',N'-tetrakis-(2-hydroxypropyl) ethylenediamine, diethyltoluenediamine, and/or dimethylthiotoluenediamine; and/or polyimides—such as polymers of pyromellitic dianhydride, 4,4'-oxydianiline, benzoquinonetetracarboxylic dianhydride, naphthalene tetracarboxylic dianhydride, 4,4'-diaminodiphenyl ether (DAPE), meta-phenylenediamine (MDA), and/or 3,3-diaminodiphenylmethane. For non-aggressive test materials, cheaper polymeric materials may be preferred such as PE, PP, or PA-6, while caustic test materials may call for fluorinated polymers, polyaramids, and/or polyimides. The first and/or second polymeric sheets are preferably affixed to the piston or base holder without chemical adhesive, though this is not a requirement.

The piston may be slidably insertable into, and removable from, the hollow upper sample holder (and the base holder), without rotating the piston, the upper sample holder, or the base holder, without unscrewing radial fixative elements, without unclamping the base holder, the upper sample holder, and/or the piston from each other. The internal and/or external surfaces of the upper sample holder, the base holder, and/or the piston may contain no threading and/or no further topological features which serve to bind or mechanically affix the upper sample holder, the base holder, and/or the piston together.

The piston bottom surface may surrounded on a perimeter by a lip (protrusion) extending longitudinally further than the piston bottom surface coextensively with the piston outer surface, and the lip may be configured to retain the second polymeric film. The lip may be an extension of the outer piston wall with no radial topological features, or the lip may contain radially inwardly extending protrusions or annular features useful in retaining the second polymeric sheet.

Inventive cells may further comprise a second, third, fourth, fifth, sixth, etc., radially oriented hole, suitable to receive the locating pin (generally in a substantially flush manner, such that the locating pin does not rattle or skew in the hole), through which the locating pin is configured to pass from the first radial side of the piston to the second radial side of the piston, and the second, third, fourth, fifth, sixth, etc., radially oriented hole may be longitudinally displaced along the piston from the first, second, third, fourth, fifth, etc., radially oriented hole. The second, third, fourth, etc., radially oriented hole may be aligned linearly, spirally, alternatingly stepped, sinusoidally, or staggered with the first, second, third, etc., radially oriented hole along the longitudinal axis of the piston.

The locating pin itself may be a t-shaped feature, as shown in the drawings, or it may have a flat cylindrical, umbrella-shaped cap (typically less concave than an umbrella), or an eye-ring, or the like. The locating pin may be configured to correspond to the shape of the radially oriented holes, which may be circular, elliptical, triangular, square, rectangular, hexagonal (e.g., like an Allen wrench), octagonal, etc. cross-section. Because the pin may also be provided by standard tools, such as an Allen wrench or a screw driver, it may not be necessary for the cell to be provided to an end user with the locating pin, though it may be preferable for the cell to include the locating pin. The end of the locating pin configured to penetrate the piston radially (typically orthogonal to the longitudinal axis) may have the same cross-section (substantially constant) as the base-side of the locating pin which has not penetrated the piston. Alternatively, the end of the locating pin may contain a topology to facilitate removal of test samples from the cell after testing and/or providing sample into the cell for testing, e.g., a spooning, flattened region, and/or pointed end or end region. The locating pin may be a two-part component, e.g., which can be screwed together such that an end piece, like a brush, spoon, and/or scraping bar, may be attached to the locating pin. The locating pin may also be a single integral component, optionally having a feature suitable to prevent the locating pin from freely sliding completely through the radially oriented hole(s).

The base holder may comprise, on the inner wall, a radially inward protrusion configured to retain the first polymeric film against the internal base wall. The cross-section, seen from a front plan cross-sectional view, may have a square, hemispherical, rectangular, triangular, trapezoidal, or "barb" (triangular) shape, such that the first polymeric film can be pushed onto the internal base wall of the base holder, preferably in a manner that causes pressure to arise onto the first polymeric sheet from the internal base wall and the radially inward protrusion. The radially inward protrusion may include a series of hemispherical dots/dimples (e.g., 2, 3, 4, 5, 6, 7, 8, 10, 12, 14, 16, 18, 20, or more) on the inner wall of the base holder. The radially inward protrusion may be a contiguous element made of the same material as the inner wall of the base holder, i.e., the radially inward protrusion may merely be a remainder from machining out an interior of the base holder, or may be a protrusion formed by casting or molding the material of the base holder. The radially inward protrusion may have a constant cross-section orthogonal to the radial direction, i.e., the radially inward protrusion may be a ring or bar of constant cross-section traversing the inner perimeter of the inner wall of the base holder, without intentional deformations, sinusoids, cut-outs, varied radially inward extension, and/or shape changes around the inner perimeter. The radially inward protrusion may have a constant cross-section orthogonal to the longitudinal axis, i.e., the radially inward protrusion may have a substantially constant cross-section along the longitudinal axis.

The base holder, the upper sample holder, and the piston may have circular, square, or hexagonal cross-sections orthogonal to the longitudinal axis. Such a circular cross-section means a cylindrical shape, at least for the corpuses (ignoring flanges and/or holes), while the square or hexagonal cross-sections mean a prismatic shape, which may offer advantages to avoid undesired rotation of the cell elements. The piston may have a (constant, i.e., unchanged along the longitudinal axis) cylindrical, square, or hexagonal prismatic shape along an entire piston length, i.e., with no outer (or inner) topological deviations in a radial direction (ignoring any radially oriented holes).

The base holder and/or the upper sample holder may comprise a flange, projecting radially outwardly, on an end towards the piston. That is, the base holder may have in an upper 67, 75, 80, 85, 90, or 95% of the base holder length, e.g., flush with the top surface of the base holder, such an exterior flange or flanges, though these may be configured for mechanical strength, rather than for clamping. Likewise, the upper sample holder may have in an upper 67, 75, 80, 85, 90, or 95% of the upper sample holder length, e.g., flush with the top surface of the upper sample holder, such an exterior flange or flanges, though these may be configured for mechanical strength, rather than for clamping.

The third longest radial dimension (e.g., diameter) and an inner longest radial dimension (e.g., diameter) of the upper sample holder may be in a range of from 35 to 100 mm, e.g., at least 35, 37.5, 40, 42, 44, 46, 48, 50, 52, 54, 56, 58, 60, 62, 64, or 65 mm and/or up to 100, 95, 90, 88, 86, 84, 82, 80, 78, 76, 74, 72, 70, 68, 66, 64, 62, 60, 58, 56, 54, 52, or 50 mm, and the third longest radial dimension (e.g., diameter) may be less than the inner longest radial dimension (e.g., diameter) of the upper sample holder.

The base holder, the upper sample holder, and the piston may each be cylindrical in shape and may be configured to be concentrically (in a longitudinal direction) aligned to each other in operation. The base holder, the upper sample holder, and the piston may each be square prismatic or hexagonal prismatic, having coaxial longitudinal centers of gravity and/or geometric centers. The base holder, the upper sample holder, and the piston may each contain no exterior tabs, wings, or discontinuous ring/flanges. The base holder, the upper sample holder, and/or the piston may contain no internal threading, e.g., such that the base holder, the upper sample holder, and/or the piston can slide longitudinally into and out of one another, rather than requiring screwing and/or rotation to connect and/or disconnect Aspects of the invention provide methods of opening a bulk crush test cell suitable for a universal testing machine, which methods may comprise without previously or thereafter releasing a fixing element on the cell, (non-rotationally) withdrawing a piston from within a hollow upper sample holder through a top portion of the upper sample holder, a lower portion of the upper sample holder resting within a base holder, to thereby directly expose a tested material within the holding and base holders, wherein the piston comprises a piston top surface, a piston bottom surface, and a piston outer surface, wherein the piston is configured for insertion through a top portion of a hollow upper sample holder and thereby apply pressure to a sample within the cell, wherein the base holder comprises a hollowed internal bottom space, defined by an inner wall, an internal base wall, an external base wall, and an outer wall, and wherein the upper sample holder comprises an inner upper sample holder wall and an outer upper sample holder wall, the upper sample holder being configured to rest in the hollowed internal bottom space, the upper sample holder being non-contiguous with the base holder.

The withdrawing may preferably occur without rotational translation of the base holder, the upper sample holder, and/or the piston, and may preferably be achieved with a simple longitudinal translation, without requiring unlatching, unscrewing, unhooking, and/or rotationally undocking the base holder, the upper sample holder, and/or the piston (either before or after the operation. The withdrawing may be a tool-free exercise, occurring in one step, and requiring no subsequent steps to separate the base holder, the upper sample holder, and/or the piston.

Inventive methods may involve the base holder, the upper sample holder, and the piston, three separate (non-contiguous) elements, being configured to hold together without further elements extending in an axial, longitudinal direction between the base holder, the upper sample holder, and the piston.

Example

Test using a device within the scope of the invention: approx. 50 cm$^3$ (49 cm$^3$) of pellets can be measured out in a measuring cylinder, then the test cell can be loaded with sample and the piston can be inserted. The test cell can be positioned between the compression plates of the universal testing machine (UTM). The test cell T-bar can be removed, and a compression load of, e.g., 6000 N between the compression plates at 2 mm/minute, can be applied and held under pressure for 30 seconds. The pressure can then be released and the sample removed. The sample remains (100%) should be collected, and the sample remains should be sieved through, e.g., a #40, i.e., 420 µm, mesh sieve for 60 seconds and the amount of fine material passing through the sieve should be weighed. The percentage fines gives an indication of the crush strength of the sample (in this exemplary case, 5.3 wt. %, whereas a pass is less than 1 wt. % fines). Thus, the sample used in the Example produced excessive fines that may block in-process filters. Images of the exemplary test are provided in FIGS. 4 to 8.

Aspects of the invention can avoid spacers and protective elements within the piston between the upper and lower surfaces, and/or may instead use two sheets/foams of a firm but flexible material such as neoprene or poly(ethylene-co-vinyl acetate) (PEVA) containing, for example, 22 wt. % of vinyl acetate, e.g., at least 15, 17.5, 20, 21, 22, 22.5, 23, 24, or 25 wt. % and/or up to 35, 32.5, 30, 27.5, 25, 24, 23, or 22.5 wt. %, located inside the lower fixture, secured in place by a rim and undercut and one on the end of the piston secured in place by a lip at the end of the piston. Two polymer, e.g., PEVA, sheets protect the sample from the hard metal surface and protect the metal from the hard sample pellets. The polymer sheets are held under slight compression by the rim and lip which prevents them from being dislodged during handling and testing. The polymer sheets can be removed as desired, e.g., by pulling the polymer sheets away from the metal surfaces.

Aspects of the invention may avoid known testing difficulties in the art by sectioning the sample holder into two as a top sample holder and a bottom sample holder. Aspects of the invention provide displaced edges during testing, so as to reduce or eliminate false particles (fines) generation. Aspects of the invention include simplified bottom holder removal.

Aspects of the invention reduce the difficulty of removing samples, and/or the formation of false fine fragmentation particles, with improved bulk crush testers before and after the test, e.g., using a device comprising a piston rod having diameter (or largest cross-sectional dimension) ranging from 40 to 100 mm, e.g., at least 40, 42.5, 45, 47.5, 50, 52, 54, 55, 56, 58, or 60 mm and/or up to 100, 95, 90, 85, 80, 75, 70, 67.5, 65, 62.5, 60, 58, 56, or 55 mm. Aspects of the invention include sample holders having diameter/width ranges of from 40 to 100 mm, e.g., at least 40, 45, 50, 55, 57.5, 60, 62, 64, 66, 68, or 70 mm and/or up to 100, 95, 90, 85, 80, 78, 76, 74, 72, 70, 68, 66, 64, 62, or 60 mm, by improving the shape of the sample holder and the attachment of the bottom sample holder. The piston (rod) will generally correspond in shape to the upper sample holder (or section) and the base holder.

Inventive apparatuses may be used to test solid pellets and/or pellet materials. Inventive apparatuses may be placed under a press and/or between the compression plates of a universal testing machine. Inventive apparatuses may pressurize samples using a downward force from the press and/or the universal tester upon the cylindrical rod. The crush strength of the pellets may be assessed by measuring the weight of fine particles generated in the crush test by sieving the pellets after releasing the downwards force from the test device.

Aspects of the invention may provide apparatuses configured to test the crush strength of one or more pellets and/or pellet materials. Such apparatuses may comprise a solid walled upper sample holder including an upper collar that fits into a single piece base holder including a piston that fits into the upper sample holder.

Aspects of the invention include reducing the complexity of assembling and/or disassembling the bulk crush test cell, for example, using a piston rod having a diameter/width ranging from 50 to 70 mm, e.g., at least 50, 52.5, 55, 57.5, 60, 62, 64, or 65 mm and/or up to 70, 67.5, 65, 62.5, 60, 58, 56, or 55 mm, with a simplified the base assembly. Aspects of invention comprise reducing the number of components/pieces required in the base assembly from four to three, two, or even one.

Aspects of the invention may allow fast, within one second, and secure assembly of the crush test cell, without the need for a retaining collar and/or screw assembly, compared to the 5 seconds required for other devices. Aspects of the invention comprise more robust assemblies, optionally further suited to be easily released after testing is complete.

Inventive devices and methods may be configured for testing sand-like proppant particles with mesh size such as 20 to 40 mesh, e.g., at least 1. Inventive devices and methods may be configured for testing catalyst pellets having a longest dimension in a range of from 0.5 mm to 5 mm, e.g., at least 0.5, 0.625, 0.75, 0.875, 1, 1.125, 1.25, 1.375, 1.5, 1.625, 1.75, 1.875, 2, 2.125, 2.25, 2.375, 2.5, 2.625, 2.75, 2.875, 3, 3.125, 3.25, 3.375, or 3.5 mm and/or up to 5, 4.875, 4.75, 4.625, 4.5, 4.375, 4.25, 4.125, 4, 3.875, 3.75, 3.625, 3.5, 3.375, 3.25, 3.125, 3, 2.875, 2.75, 2.625, 2.5, 2.375, 2.25, 2.125, 2, 1.875, 1.75, 1.625, 1.5, 1.375, 1.25, 1.125, or 1 mm.

While inventive devices may be particularly used for No. 20 to 40 mesh (US sieve size), or 20, 24, 28, 32, or 35 Mesh Tyler equivalent (with opening size in mm and in below), the application may be extended or restricted as desired, to other meshes. Meshes with no US sieve size include 2½ mesh (8.00 mm, 0.312") and 3 mesh (6.73 mm, 0.265"). US sieve sizes include No. 3½, i.e., 3½ mesh (5.66 mm, 0.233"), No. 4, i.e., 4 mesh (4.76 mm, 0.187"), No. 5, i.e., 5 mesh (4.00 mm, 0.157"), No. 6, i.e., 6 mesh (3.36 mm, 0.132"), No. 7, i.e., 7 mesh (2.83 mm, 0.111"), No. 8, i.e., 8 mesh (2.38 mm, 0.0937"), No. 10, i.e., 9 mesh (2.00 mm, 0.0787"), No. 12, i.e., 10 mesh (1.68 mm, 0.0661"), No. 14, i.e., 12 mesh (1.41 mm, 0.0555"), No. 16, i.e., 14 mesh (1.19 mm, 0.0469"), No. 18, i.e., 16 mesh (1.00 mm, 0.0394"), No. 20, i.e., 20 mesh (0.841 mm, 0.0331"), No. 25, i.e., 24 mesh (0.707 mm, 0.0278"), No. 30, i.e., 28 mesh (0.595 mm, 0.0234"), No. 35, i.e., 32 mesh (0.500 mm, 0.0197"), No. 40, i.e., 35 mesh (0.420 mm, 0.0165"), No. 45, i.e., 42 mesh (0.354 mm, 0.0139"), No. 50, i.e., 48 mesh (0.297 mm, 0.0117"), No. 60, i.e., 60 mesh (0.250 mm, 0.0098"), No. 70, i.e., 65 mesh (0.210 mm, 0.0083"), No. 80, i.e., 80 mesh (0.177 mm, 0.0070"), No. 100, i.e., 100 mesh (0.149 mm, 0.0059"), No. 120, i.e., 115 mesh (0.125 mm, 0.0049"), No. 140, i.e., 150 mesh (0.105 mm, 0.0041"), No. 170, i.e., 170 mesh (0.088 mm, 0.0035"), No. 200, i.e., 200 mesh (0.074 mm, 0.0029"), No. 230, i.e., 250 mesh (0.063 mm, 0.0025"), No. 270, i.e., 270 mesh (0.053 mm, 0.0021"), No. 325, i.e., 325 mesh (0.044 mm, 0.0017"), and/or No. 400, i.e., 400 mesh (0.037 mm, 0.0015").

Aspects of the invention comprise a length (axial) to width (radial) ratio of a piston element of at least 1, 1.25, 1.5, 1.75, 2, 2.25, 2.5, 2.75, 3, 3.5, 4, or 5 (axial length) to 1 (radial width), and/or up to 15, 12.5, 10, 9, 8, 7.5, 7, 6.5, 6, 5.5, 5, 4.5, 4, 3.5, 3, 2.5, or 2 (axial length) to 1 (radial width). A higher length-to-width ratio may give better stability of the piston and prevents it from twisting and/or tilting left and right (radially), causing the piston to jam in the hollow cylinder.

Inventive devices may contain 1, 2, 3, 4, or all surfaces in contact with test samples that are not glass lined, preferably containing no glass, and/or no lubricant. Inventive devices may employ pistons having linear and/or flat outer surfaces in a direction parallel to the central length axis, which may prevent jamming caused by misalignments of the piston and upper sample holder. Inventive devices may avoid the need to use any location or securing devices between the base and the cylinder and/or between the cylinder and the top portion.

Referring now to the drawings, wherein like reference numerals designate identical or corresponding parts throughout the several views.

Figure 1B:
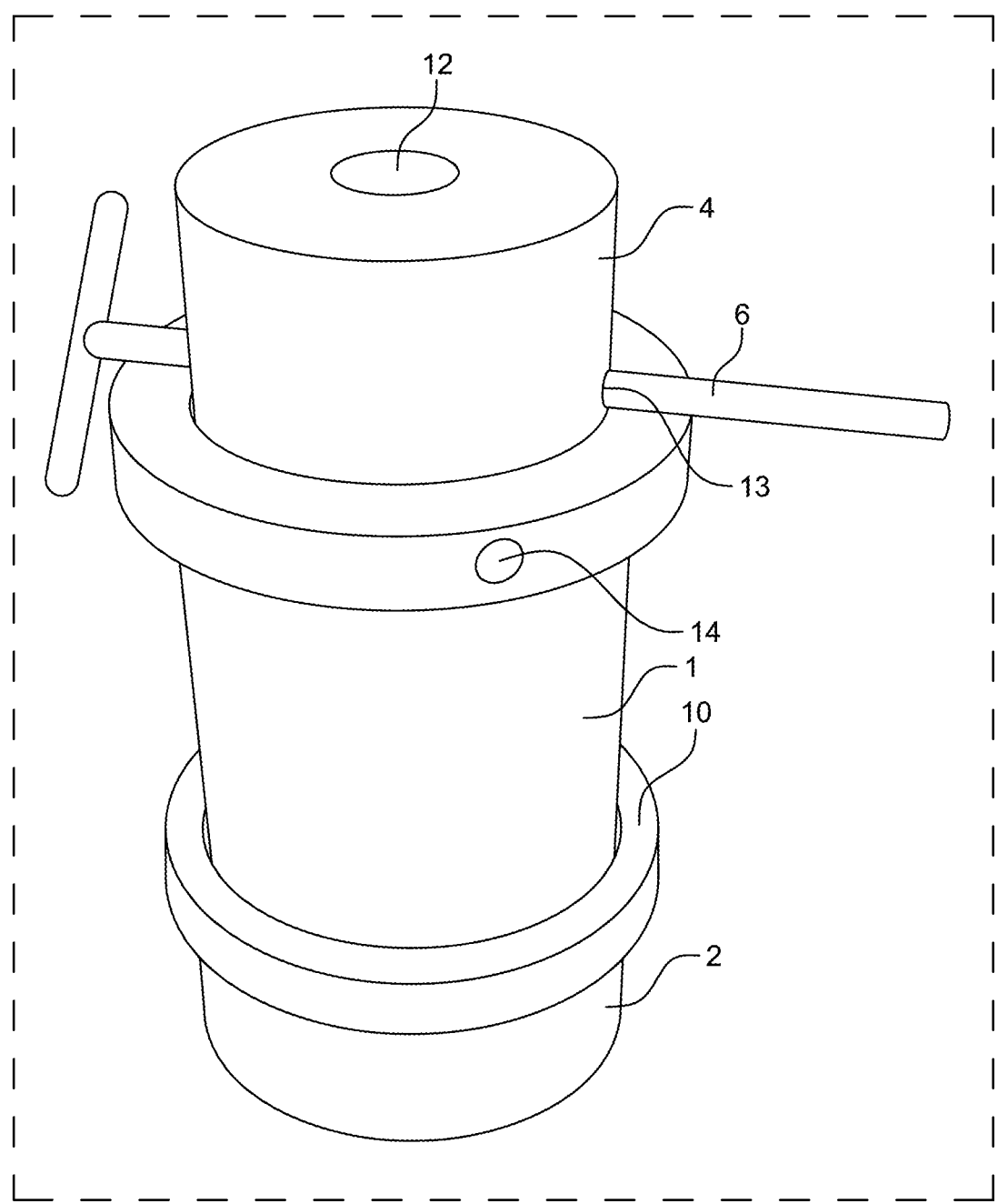
FIG. 1B shows a top, left isometric photographic view of an exemplary crush strength test cell assembly apparatus, with a rotated top.

FIG. 1A shows a top, left isometric view of an exemplary crush strength test cell assembly apparatus, while FIG. 1B shows a photograph of a similar isometric view. As seen in FIG. 1A, Inventive apparatuses may comprise a cylindrical shaped base holder (2), e.g., having an opening on the top, seen from a top plan view, and a groove cut inside at the bottom wherein a suitable soft material disc (5), such as any of the polymeric materials described herein, for example, is placed. The base holder (2) may have a collar section, flange, or the like, on a top portion of the base holder (2), the collar section comprising an opening so as to create a seat/sitting position for the cylindrical shape top holder (1) having small through holes on the surface. The top holder (1) may have one or more openings on each side, mounted on the base holder (2) such that the top holder (1) creates a space inside the assembly including the base holder (2) and the top holder (1) wherein the sample to be tested is filled. A correspondingly shaped element, e.g., a cylindrical rod (3) for rounded device forms, can pass through the top holder (1) and the base holder (2) when the apparatus is in use. Such a cylindrical or alternately-shaped rod (3) may have a depthcut at the bottom of the rod (3), wherein a suitable soft material, e.g., the same as or different from the disc (5) material, can be attached and optionally further have small through-hole on the surface, preferably corresponding to the shape of the rod (3).

The upper sample holder (1) may be considered a central component of the testing cell, in that it typically has an intermediate outer diameter/longest radial dimension ($d_2$) relative to the outer diameter/longest radial dimension ($d_1$) of the piston (4) and the outer diameter/longest radial dimension ($d_3$) of the base holder (2). Although the upper sample holder (1) is shown in the drawings with an upper flange having an upper sample holder flange length ($b_1$) and a depth not enumerated in the drawings, the flange is optional, and the radial extension of the flange beyond the surface of the upper sample holder diameter/longest radial dimension ($d_2$) by no more than 10, 9, 8, 7.5, 7, 6, 5, 4, 3, 2, 1, or 0.5% of the upper sample holder radius/half width ($d_2/2$). The upper sample holder (1) may have 0, 1, 2, 3, 4, 5, or more such flanges. Each flange may independently have 0, 1, 2, 3, 4, 5, 6, 8, or 10 upper sample holder side hole(s) (14), and the upper sample holder side hole(s) need not penetrate through the wall of the upper sample holder (1). A cross-section of the upper sample holder (1), when cut in a plane orthogonal to the longitudinal axis (L), may be that of an annulus, as in the views of the exemplary cell shown in the drawings, or may be a triangular, rectangular (or square), pentagonal, hexagonal, octagonal with an inner wall, facing the sample, and an outer wall facing the exterior environment. The wall thickness of the upper sample holder (1) may be, for example, at least 1, 2, 2.5, 3, 4, 5, 6, 7, 7.5, 8, 9, or 10 mm and/or up to 25, 22.5, 20, 18, 16, 14, 12, 10, 9, 8, 7.5, 6, 5, 4, or 3 mm, depending upon the application. The upper sample holder (1) may contain, or surround, a volume of, e.g., at least 10, 15, 20, 25, 30, 35, 40, 45, 50, 60, 75, 100, 125, 150, 200, 250, 500, 1000 cm$^3$ (mL) and/or up to 5, 4, 3, 2, 1.5, 1, 0.75, 0.67, 0.5, 0.45, 0.4, 0.35, 0.3, 0.275, 0.25, 0.225, 0.2, 0.175, 0.15, 0.125, 0.1 L. The upper sample holder (1) may contain no threaded holes and/or no clamping flanges. The upper sample holder (1) may have a smooth and/or flat topology, i.e., rounded cylindrical surface without indentation and/or protrusion or planar, in the case of prismatic shapes. The length ($a_2$) of the upper sample holder (1) may be in a relationship to the upper sample holder flange length ($b_1$) of at least 1, 1.5, 2, 2.5, 3, 4, 5, 6, 7, or 8 to 1 and/or up to 30, 25, 20, 18, 16, 14, 12, 10, 9, 8, 7, 6, or 5 to 1. The upper sample holder length ($a_2$) may have a ratio to the piston length ($a_1$) in a range of from, for example, at least 0.1, 0.15, 0.25, 0.33, 0.4, 0.5, 0.67, 0.75, 0.875, 1, 1.25, 1.5, 1.75, 2, or 2.5 to 1 and/or up to 5, 4.5, 4, 3.5, 3, 2.5, 2, 1.75, 1.5, 1.25, or 1 to 1. The upper sample holder length ($a_2$) may have a ratio to the base holder length ($a_3$) in a range of from, for example, at least 1, 1.5, 2, 2.5, 3, 4, 5, 7.5, or 10 to 1 and/or up to 30, 25, 20, 18, 16, 15, 14, 13, 12, 11, 10, 9, 8, 7.5, 7, or 6 to 1. The upper sample holder (1) may allow the avoidance of bars and/or rods in along the longitudinal axis (L) and/or in the radial direction (R), or may contain no more than 5, 4, 3, 2, or 1 of these.

The base holder (2) may be considered a lower and/or outer component of the testing cell, in that it may have the largest outer diameter/longest radial dimension ($d_3$), relative to the intermediate outer diameter/longest radial dimension ($d_2$) of the upper sample holder (1), and to the typically narrowest outer diameter/longest radial dimension ($d_1$) of the piston (4). Although the base holder (2) is shown in the drawings with an upper flange, depicted as a stabilizing ring (10), having an upper sample holder flange length ($b_2$) and a depth not enumerated in the drawings, the flange is optional, and the radial extension of the flange beyond the surface of the base holder diameter/longest radial dimension ($d_3$) by no more than 10, 9, 8, 7.5, 7, 6, 5, 4, 3, 2, 1, or 0.5% of the base holder radius ($d_3/2$). The base holder (2) may have 0, 1, 2, 3, 4, 5, or more such flanges. While the base holder (2) may have one or more holes, particularly on the flange, no hole is necessary on the base holder (2) and any holes need not penetrate through the wall of the base holder (2). Like the upper sample holder (1), and generally corresponding to the upper sample holder (1), the cross-section of the base holder (2), when cut in a plane orthogonal to the longitudinal axis (L), may be that of an annulus, as in the views of the exemplary cell shown in the drawings, or may be a triangular, rectangular (or square), pentagonal, hexagonal, octagonal with an inner wall, facing the sample, and an outer wall facing the exterior environment. The wall thickness of the base holder (2) may be, for example, at least 1, 2, 2.5, 3, 4, 5, 6, 7, 7.5, 8, 9, or 10 mm and/or up to 25, 22.5, 20, 18, 16, 14, 12, 10, 9, 8, 7.5, 6, 5, 4, or 3 mm, depending upon the application. The base holder (2) may contain no threaded holes and/or no clamping flanges, and requires no longitudinally and/or radially extending fixative means, such as bars, screws, clamps, hooks, or the like. The base holder (2), like the upper sample holder (1), may independently have a smooth and/or flat topology, i.e., rounded cylindrical surface without indentation and/or protrusion or planar, in the case of prismatic shapes, which will generally correspond to the upper sample holder (1), but are not required to.

The length ($a_3$) of the base holder (2) may be in a relationship to the base holder flange length ($b_2$) of at least 1, 1.5, 2, 2.5, 3, 4, 5, 6, 7, or 8 to 1 and/or up to 20, 18, 16, 14, 12, 10, 9, 8, 7, 6, or 5 to 1. The base holder length ($a_3$) may have a ratio to the piston length ($a_1$) in a range of from, for example, at least 0.05, 0.1, 0.15, 0.2, 0.25, 0.3, 0.33, 0.4, 0.45, 0.5, 0.55, 0.6, 0.65, 0.7, 0.75, 0.8, 0.85, 0.9, 0.95, or 1 to 1 and/or up to 2, 1.75, 1.5, 1.25, 1, 0.9, 0.85, 0.8, 0.75, 0.7, 0.65, 0.6, 0.55, 0.5, 0.45, 0.4, 0.35, or 0.3 to 1. The base holder length ($a_3$) may have a ratio to the upper sample holder length ($a_2$) in a range of from, for example, at least 0.05, 0.1, 0.15, 0.2, 0.25, 0.3, 0.33, 0.4, 0.45, 0.5, 0.55, 0.6, 0.65, 0.7, 0.75, 0.8, 0.85, 0.9, 0.95, or 1 to 1 and/or up to 2, 1.75, 1.5, 1.25, 1, 0.9, 0.85, 0.8, 0.75, 0.7, 0.65, 0.6, 0.55, 0.5, 0.45, 0.4, 0.35, or 0.3 to 1. The base holder (2) may allow the avoidance of bars and/or rods in along the longitudinal axis (L) and/or in the radial direction (R), or may contain no more than 5, 4, 3, 2, or 1 of these. The internal base of the base holder (2) will generally have a lip, rim (8), edge, pegs, dimples, or the like, extending radially inwardly above a base surface, wherein the base surface has an undercut (9) or region providing space/volume radially outwardly with respect to the rim (8) or analog thereto. In such an undercut (9), a piece of polymer (optionally elastomer or any other material described herein or otherwise useful for the specimen in question) to be inserted and mechanically retained below the rim (8). Generally only one rim (8) is necessary to retain the film, though dimples, nubs, tabs, or the like, i.e., discontinuous inner surface topologies, may usefully have 2, 3, 4, 5, 6, or more features. The axial, longitudinal (L) length of such rim (8) or analogous feature and/or of the undercut (9) may independently be, e.g., at least 1, 2, 2.5, 3, 4, 5, 7.5, 10, 12.5, 15, or 20% of the total inner longitudinal length of the base holder (2) and/or up to 40, 33, 30, 27.5, 25, 22.5, 20, 17.5, 15, 12.5, 10, 9, 8, 7.5, 7, 6, or 5% of the total inner longitudinal length of the base holder (2).

The piston (4) is generally a solid or hollow, but walled on all sides, component which can be considered to be the top of the testing cell. The piston (4) will typically have the smallest outer diameter/longest radial dimension ($d_1$), relative to the (intermediate) upper sample holder (1) outer diameter/longest radial dimension ($d_2$) and to the typically largest outer diameter/longest radial dimension ($d_3$) of the base holder (2). The piston (4) may have a longer length ($a_1$) in the longitudinal (axial) direction (L) than the length ($a_2$) of the upper sample holder (1), e.g., by at least 5, 10, 15, 20, 25, 33, 40, or 50% and/or up to 250, 225, 200, 175, 150, 125, 100, 90, 80, 75, 70, 65, 60, 55, 50, 45, 40, or 33%. The piston (4) need not have any flanges, though flanges in the upper portion are not precluded. The piston (4) will generally have in its mid-region, i.e., within about 50±2.5, 5, 7.5, 10, 15, or 20% of the total piston length ($a_1$), 1, 2, 3, 4, 5, 6, or more piston side holes (13), which may serve to accommodate the locating pin (6). The side holes (13) may be arranged linearly along the longitudinal axis (L), in parallel, spirally, or the like, and the shape of the side holes (13, 14), while shown as circular, may be any useful shape, including circular, elliptical, rectangular, square, hexagonal, etc., in cross-section. The piston side hole(s) (13) may be arranged to allow the locating pin (6) to extend through the piston (4) and rest upon the upper edge of the upper sample holder (1) to prevent the unintentional sinking of the piston (4) onto any sample within the cell. The bottom of the piston (4) may have an arrangement, such as a lip (11) or an analogous rim (9)/undercut (8) arrangement to retain a sheet (5) of material, such as any of the polymeric and/or elastomeric materials described herein. The lip (3) or analogous arrangement may extend longitudinally from the base of the piston (4), e.g., at least 0.5, 1, 1.5, 2, 2.5, 3, 4, or 5% of the piston length ($a_1$) and/or up to 20, 17.5, 15, 12.5, 10, 9, 8, 7, 6, or 5% of the piston length ($a_1$). The piston (4) may also have an element suitable for locking or affixing the cell into a universal testing machine (UTM), such as a recess (12), which may be a hemispherical, cylindrical, square prismatic, etc., indentation or set of (typically symmetric) indentations into the top surface of the piston, indenting in an axial direction (L). The recess(es) (12) may be replaced or supplemented by protrusions extending axially upwardly from the top surface of the piston (4). The recess(es) (12) may have a diameter/longest radial dimension ($d_{12}$) of, e.g., at least 2.5, 5, 6, 7, 7.5, 8, 9, 10, 12.5, 15, or 20% and/or up to 33, 30, 27.5, 25, 22.5, 20, 17.5, or 15% of the diameter/longest radial dimension ($d_1$) of the piston (4). The piston length ($a_1$) may have a ratio to the base holder length ($a_3$) in a range of from, for example, at least 0.5, 0.75, 1, 1.25, 1.5, 1.75, or 2 to 1 and/or up to 5, 4.5, 4, 3.5, 3, 2.5, 2, 1.75, 1.5, 1.25, or 1 to 1.

The upper sample holder (1), base holder (2), and/or piston (4) may be independently made from a material appropriate for the mechanical testing stresses, e.g., stainless steel, brass, copper, other steel varieties, carbon-fiber polymer composite, glass-fiber polymer composite, pure polymer, etc. Relevant polymers may include, for example, homopolymers, copolymers, and/or terpolymers (or blends of any of these) of: acrylics—such as methyl methacrylate, methyl acrylate, ethyl methacrylate, ethyl acrylate, acrylonitrile, acrylic acid, and/or methacrylic acid; olefins—such as ethylene and/or propylene; polyamides—such as polymers of dodecanediamine, decanediamine, octanediamine, hexamethylenediamine, tetramethylendiamine, caprolactam, 11-aminoundecanoic, terephthalic acid, 1,5-pentanedioic acid (glutaric acid), 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,11-undecanedioic acid, 1,12-dodecanedioic acid, 1,13-tridecanedioic acid (brassylic acid), m-xylylenediamine, paraphenylenediamine, terephthalic acid, 1,10-decamethylendiamine, and/or dodecano-12-lactam (lauric lactam), e.g., PA 6 (or nylon 6), PA 12, PA 6,6, PA 6T, PA 1,6, PA 6,9, PA 6,12, PA 11, PA 4,6, PA 12,12, PA 10,10, etc.; polyesters—such as polyethyl terephthalate (PET), polybutyl terephthalate (PBT), polytrimethylenterephthalate (PTT), polyethylennaphthalate (PEN), polyethylene adipate (PEA), polybutylene succinate (PBS), polyglycolic acid (PGA), polylactic acid (PLA), polycaprolactone (PCL), polyhydroxybutyrate (PHB), poly-(R)-3-hydroxybutyrate (P3HB), poly-4-hydroxybutyrate (P4HB), poly-3-hydroxyvalerate (PHV), poly(3-hydroxybutyrate-co-3-hydroxyvalerate; polyether ether ketones (PEEK); polyurethanes (PU)—such as PUs comprising polycarbonate(s), polyether(s), and/or polyester(s), and/or toluene diisocyanate (TDI), methylene diphenyl diisocyanate (MDI), 1,6-hexamethylene diisocyanate (HDI), 1-isocyanato-3-isocyanatomethyl-3,5,5-trimethyl-cyclohexane (i.e., isophorone diisocyanate, IPDI), 4,4'-diisocyanato dicyclohexylmethane, ($H_{12}$MDI or hydrogenated MDI), polypropylene oxide (PPO), polyethylene oxide (PEO), poly(tetramethylene ether) glycol, dipropylene glycol, glycerine, sorbitol/water solution, ethylenediamine, triethanolamine, ethylene glycol, 1,4-butanediol (1,4-BDO), 1,6-hexanediol, cyclohexane dimethanol, hydroquinone bis(2-hydroxyethyl) ether (HQEE), ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,4-cyclohexanedimethanol, ethanolamine, diethanolamine, methyldiethanolamine, phenyldiethanolamine, glycerol, trimethylolpropane, 1,2,6-hexanetriol, triethanolamine, pentaerythritol, N,N,N',N'-tetrakis-(2-hydroxypropyl) ethylenediamine, diethyltoluenediamine, and/or dimethylthiotoluenediamine; and/or polyimides—such as polymers of pyromellitic dianhydride, 4,4'-oxydianiline, benzoquinonetetracarboxylic dianhydride, naphthalene tetracarboxylic dianhydride, 4,4'-diaminodiphenyl ether (DAPE), meta-phenylenediamine (MDA), and/or 3,3-diaminodiphenylmethane.

Figure 2A:
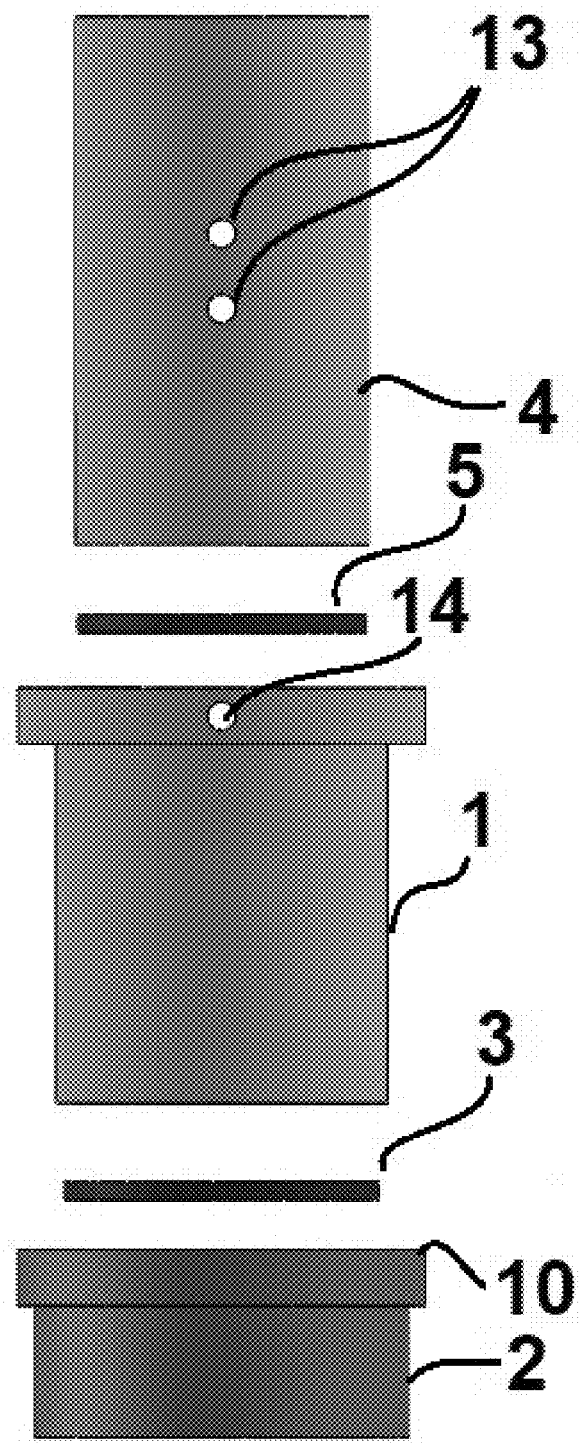
FIG. 2A shows a front plan view of an exemplary test cell assembly within the scope of the invention.
Figure 2B:
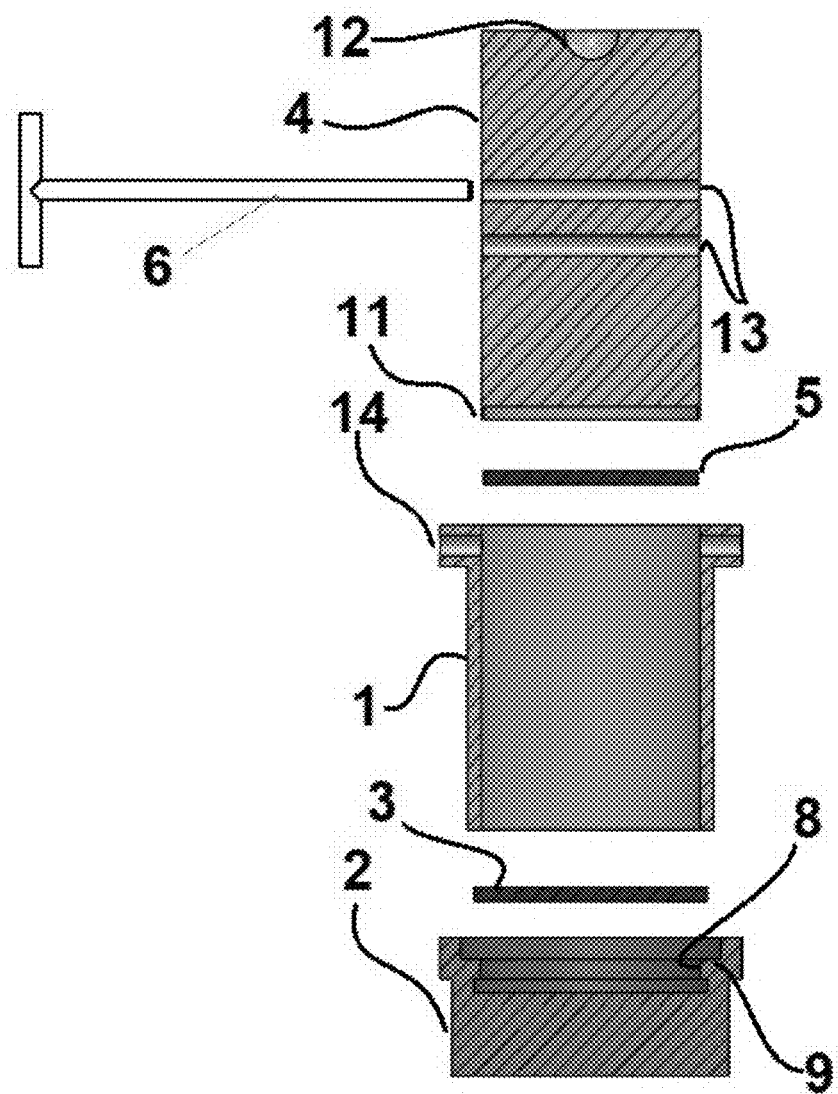
FIG. 2B shows a right-side cross-sectional plan view of an exemplary test cell assembly within the scope of the invention.

FIG. 2 shows a front plan view (left), a scaled-out top, left isometric view (center), and a right side cross-sectional view or an exemplary test cell assembly. FIG. 2 show an exemplary top holder and base holder, which can be located using a locating pin (6), which passes through the holes in the upper piston (4). The locating pin (6) can also be used for stirring the sample.

Figure 3:
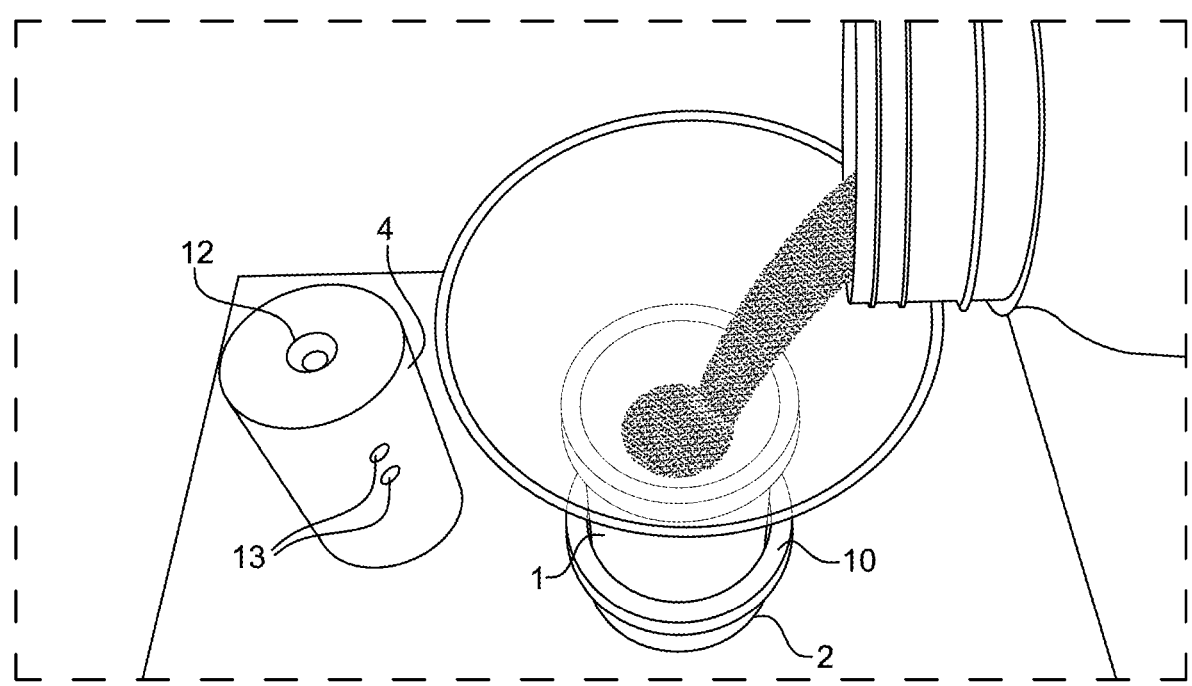
FIG. 3 shows a photographic view of an exemplary sample chamber of an inventive device, wherein an amberlyst catalyst is loaded into the crush cell.
Figure 4:
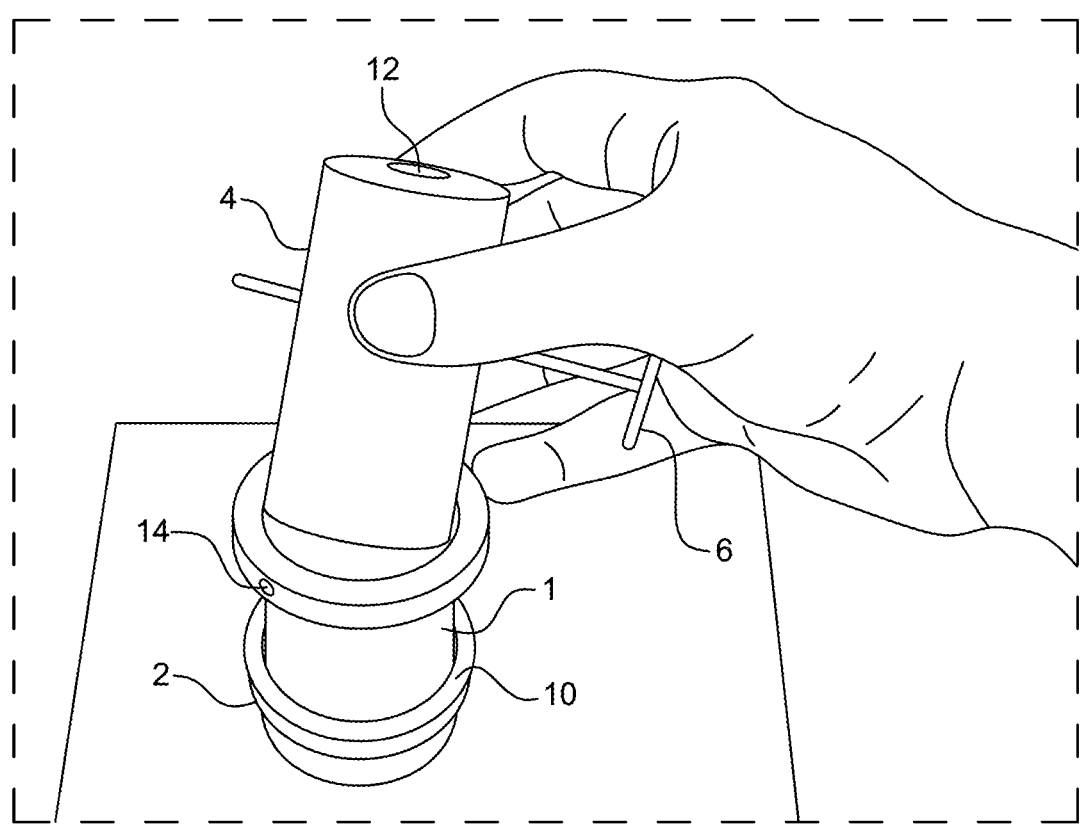
FIG. 4 shows a photographic view of an exemplary sample chamber of an inventive device, wherein the piston is inserted.
Figure 5:
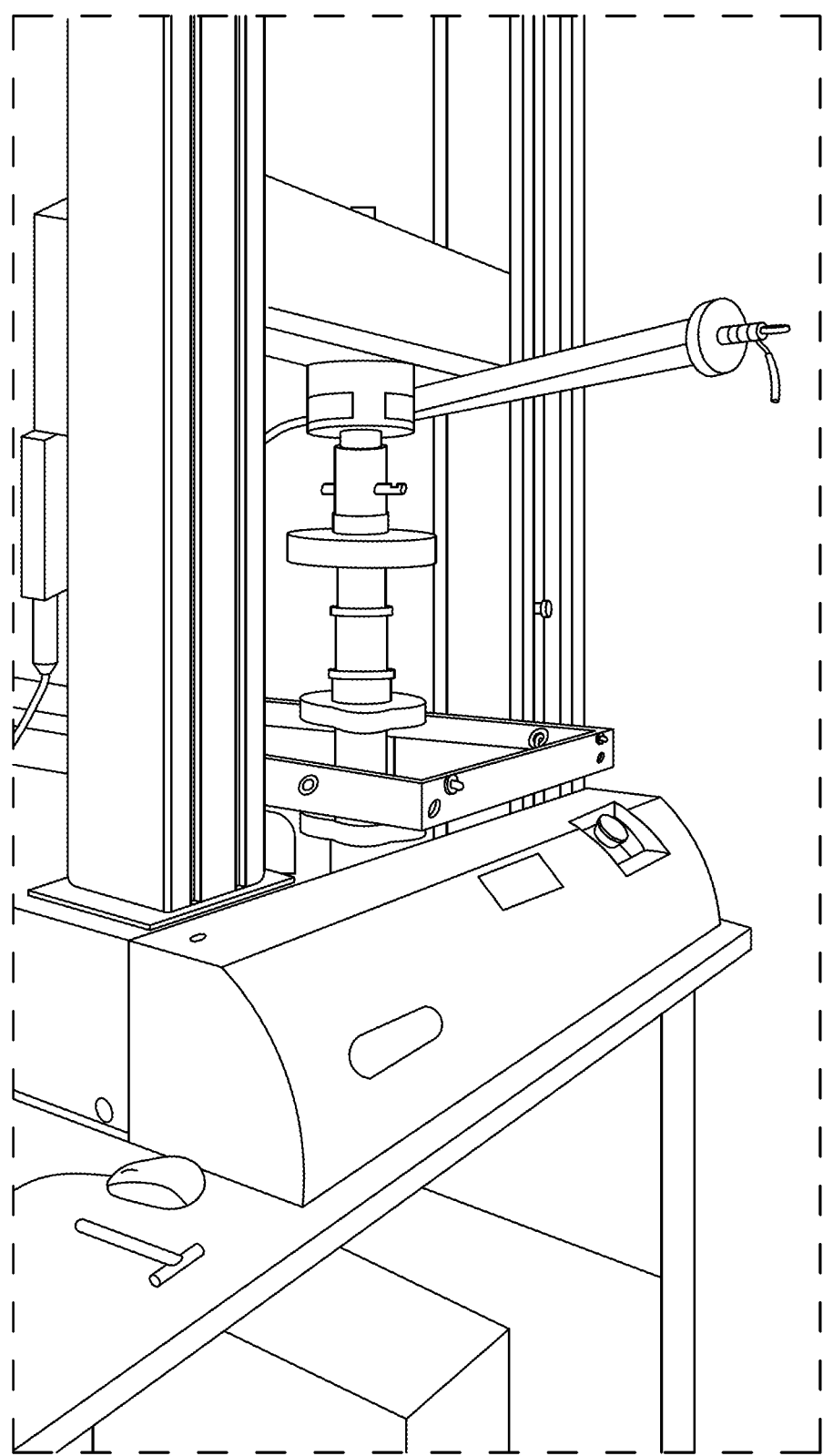
FIG. 5 shows a photographic view of an exemplary sample chamber of an inventive device, wherein the cell is loaded into a testing machine.
Figure 6:
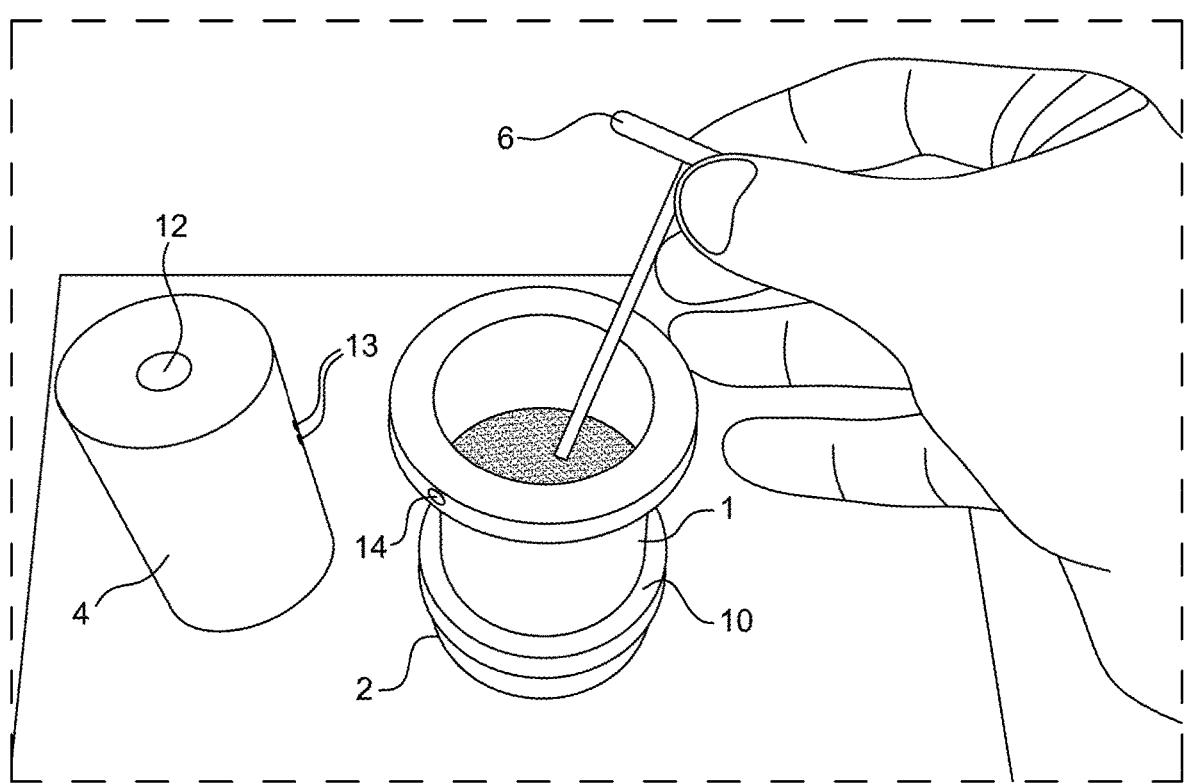
FIG. 6 shows a photographic view of an exemplary sample chamber of an inventive device, wherein the cell is opened and the sample is stirred with a T-bar to free the sample.

FIG. 3 shows a photographic view of a sample chamber of an inventive device, wherein an amberlyst catalyst is loaded into the crush cell. FIG. 4 shows a photographic view of a sample chamber of an inventive device, having the piston (4) is inserted. FIG. 5 shows a photographic view of a sample chamber of an inventive device, depicting the cell being mounted in a testing machine. FIG. 6 shows a photographic view of an exemplary sample chamber of an inventive device, depicting the cell being opened and the sample being stirred/agitated with a T-bar to free the sample. For some samples, the pellets can become compacted in the test cell after testing, and the easy release and separation of the upper sample holder and base holder can allow that the compacted pellets can be removed from the test cell without causing further damage to the sample, as seen in FIG. 6. The locating pin T-bar (6) can be used to gently push out compacted sample from the test cell without causing further damage to the test pellets.

Further, when inserted into either of the holes the T-bar holds the piston off the sample before and after the test and thus prevents the sample from experiencing the piston load before the test begins. If the sample is particularly fragile the pre-loading of the sample could cause additional crush damage. Two holes are preferably provided to accommodate samples having different bulk densities and thereby required that the piston be held at different heights above the sample. The T-bar helps with disassembly because the piston can be lifted off the sample after the test and its position locked with the T-bar after which the base holder can be released without the piston pressing down on the sample.

Figure 7:
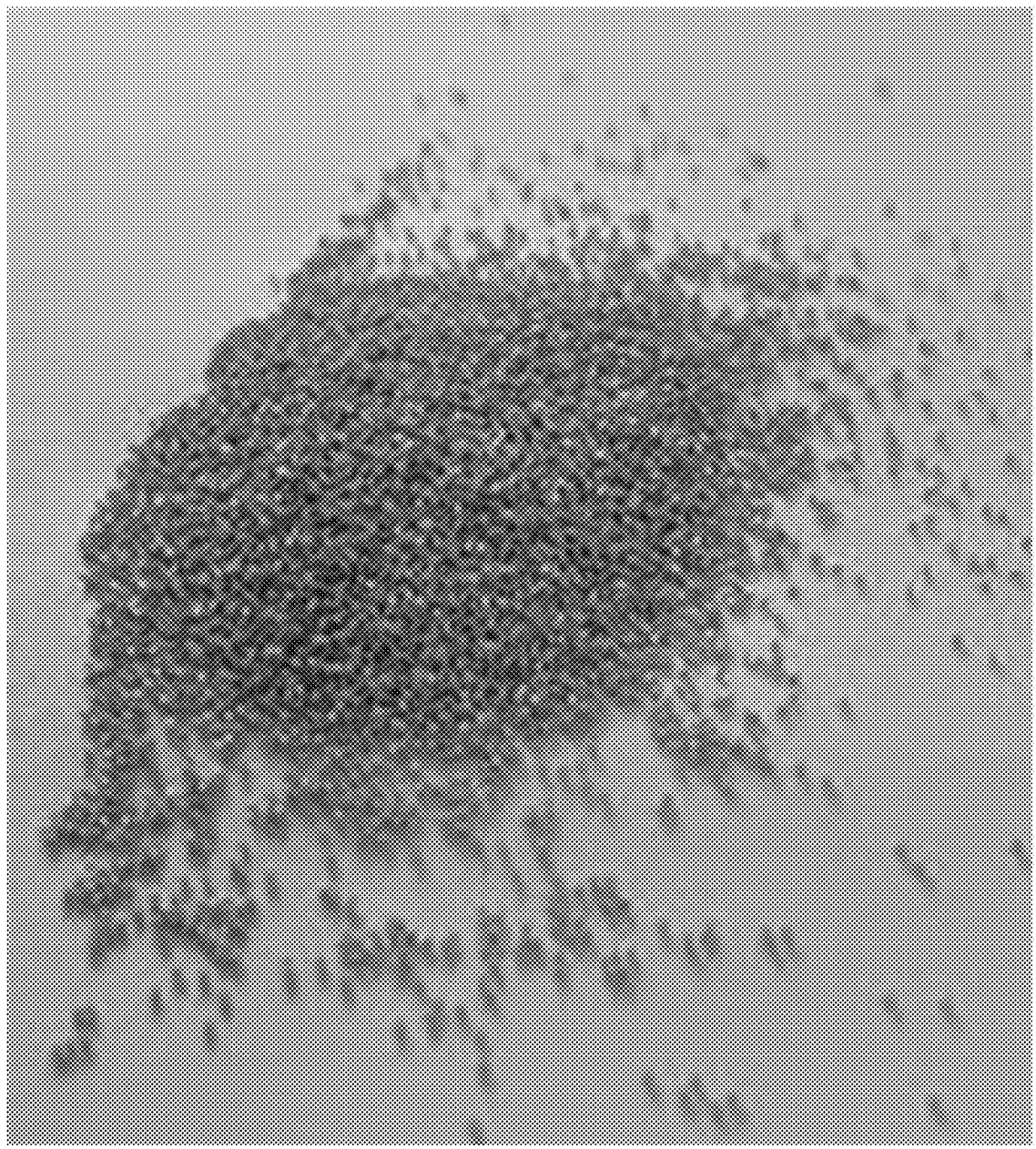
FIG. 7 shows a photographic view of the freed sample after testing.
Figure 8:
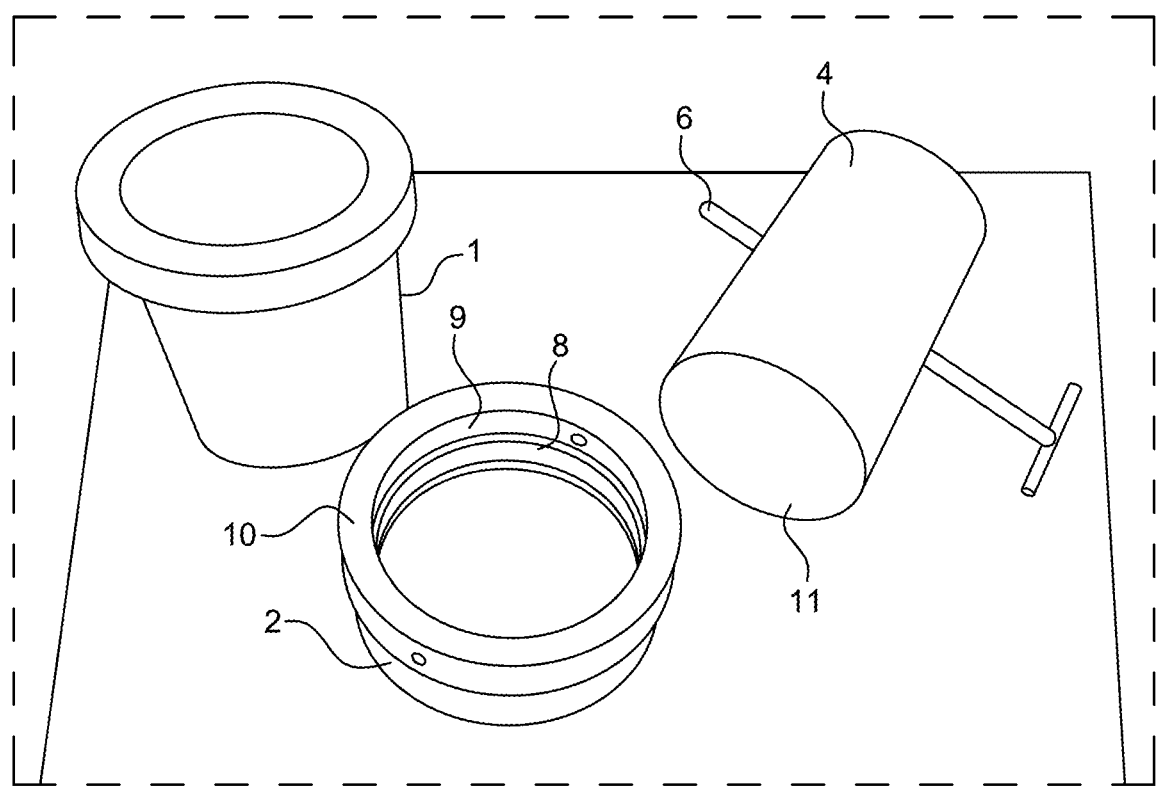
FIG. 8 shows a photographic view of an exemplary sample chamber of an inventive device, depicting quick and easy disassembly for cleaning.

The sample holder (1) the base holder (2) may be easily separated by twisting the parts even when the test material has been compacted and jammed inside the test cell during the crush test. FIG. 7 shows a photographic view of the freed sample after testing. FIG. 8 shows a photographic view of an exemplary sample chamber of an inventive device, depicting quick and easy disassembly for cleaning, wherein all component are separated.

Figure 9A:
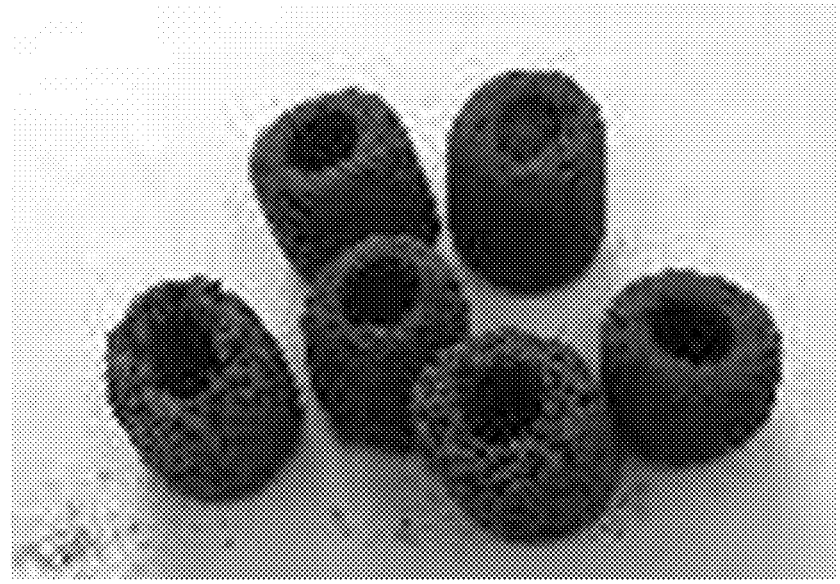
FIG. 9A shows a ceramic catalyst before testing in an inventive device.
Figure 9B:
FIG. 9B shows a ceramic catalyst after testing in an inventive device.

FIGS. 9A and 9B show a ceramic catalyst before and after testing in an inventive device. The fine particulate matter may be filtered or sieved through a desired sieve mesh to test the crush strength of the material in question.

Figure 10:
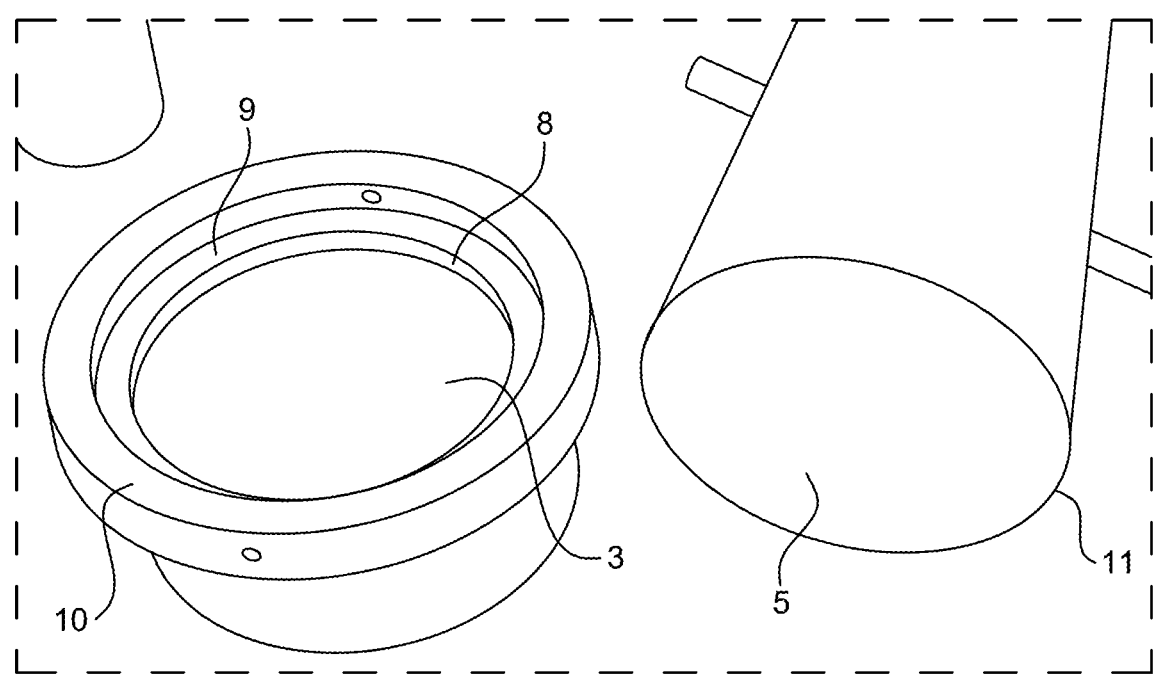
FIG. 10 shows the lower section and piston of an exemplary device showing the location of the two polymeric (here, EVA) sheets to protect the sample from the hard metal surfaces and protect the metal from the hard sample pellets, as well as a mechanism for their location using a rim and undercut in the base and a rim at the piston end.
Figure 11:
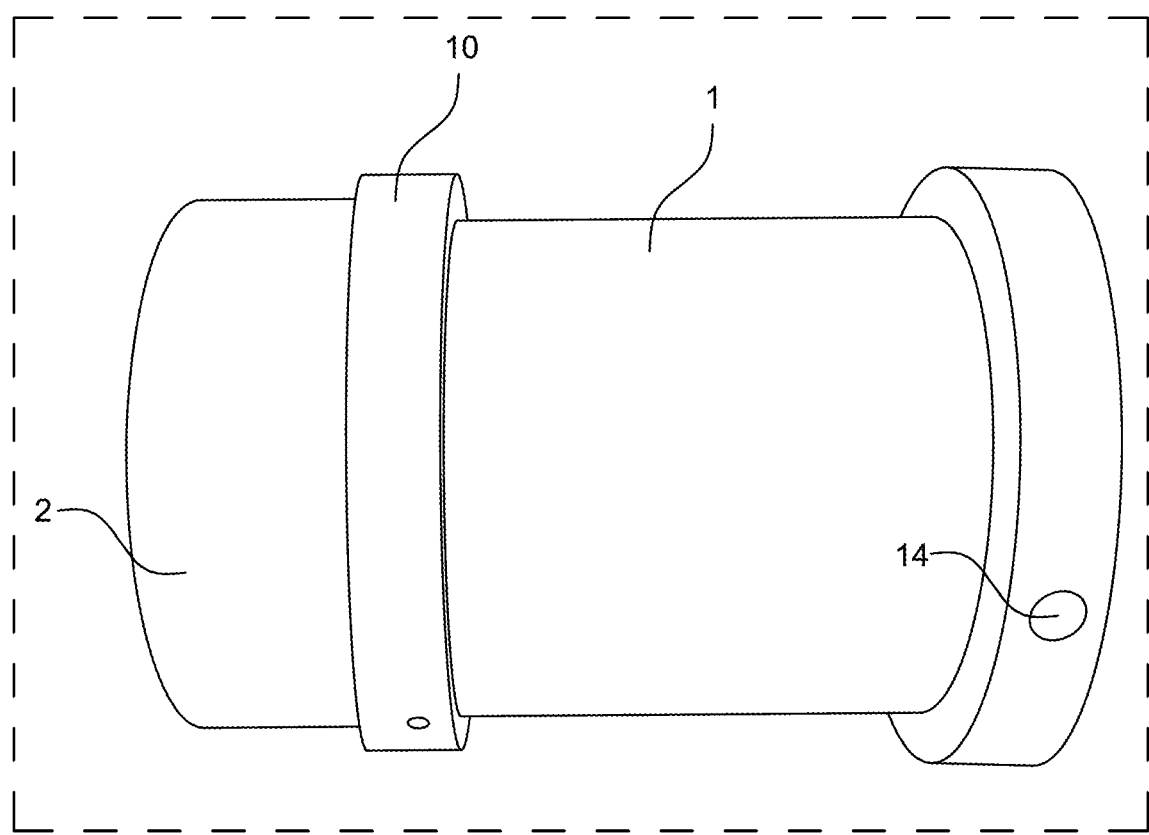
FIG. 11 shows a base holder and an upper sample holder of an exemplary device, in engaged position.
Figure 12:
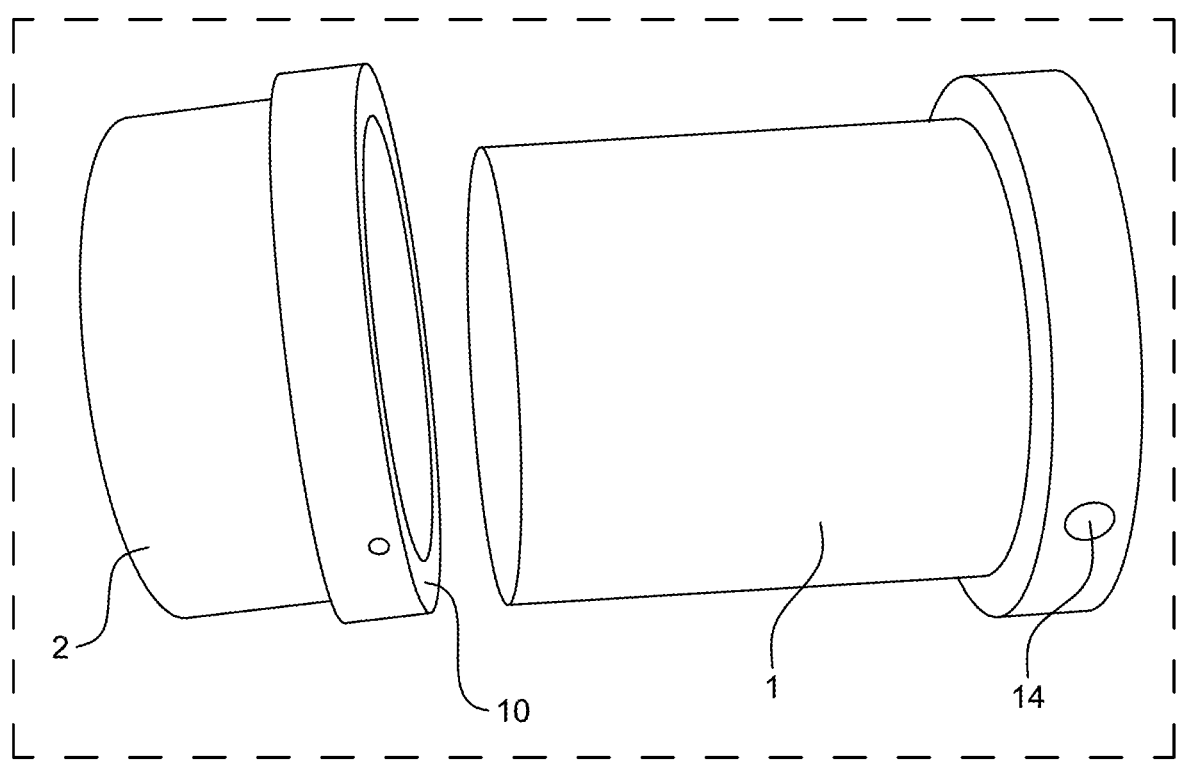
FIG. 12 shows a base holder and an upper sample holder of an exemplary device, in disengaged position.

FIG. 10 shows the lower section and piston (4) of an exemplary device showing the location of the two polymeric (here, EVA) sheets (5, 7) to protect the sample from the hard metal surfaces in the base holder (2) and the bottom holder (3) and protect the metal from the hard sample pellets, as well as a mechanism for their location using a rim (9) and undercut (8) in the base holder (2) and a rim (9) at the piston (4) end. Complete removal of the sample may be hampered if the lower section of the test cell cannot be removed. Therefore, the base holder (2) and the upper sample holder (1) may be configured to be easily disengaged by manually twisting the two parts and pulling them apart as seen in FIGS. 10 to 12. The two parts within the scope of the invention may be machined such that they fit snugly together. The base holder (2) is generally bulky enough, with enough penetration of the upper sample holder (2), to hold the two pieces in place under the pressure of the test conditions without requiring any locating or fixing devices. The stabilizing ring (10) at the top of the base holder (2) can allows the upper sample holder (1) to locate into the base holder (2) securely in a robust way, such that the assembly can withstand the full force of the crush test without needing any fixing or locating features. The upper sample holder (1) and the base holder (2) may be easily separated after the crush test so that 100% of test sample can be removed from the crush cell for weighing.

FIGS. 11 and 12 shows a base holder (2) and an upper sample holder (1) of an exemplary device, easily engageable and disengageable by twisting the two parts by hand. No guide or securing device is needed to affix, locate, or hold the two pieces in position. The base holder (2) and the upper sample holder (1) can be easily engaged and disengaged by twisting the two parts, even by hand. No guide or securing device is required to locate or hold the two pieces in position.

Figure 13:
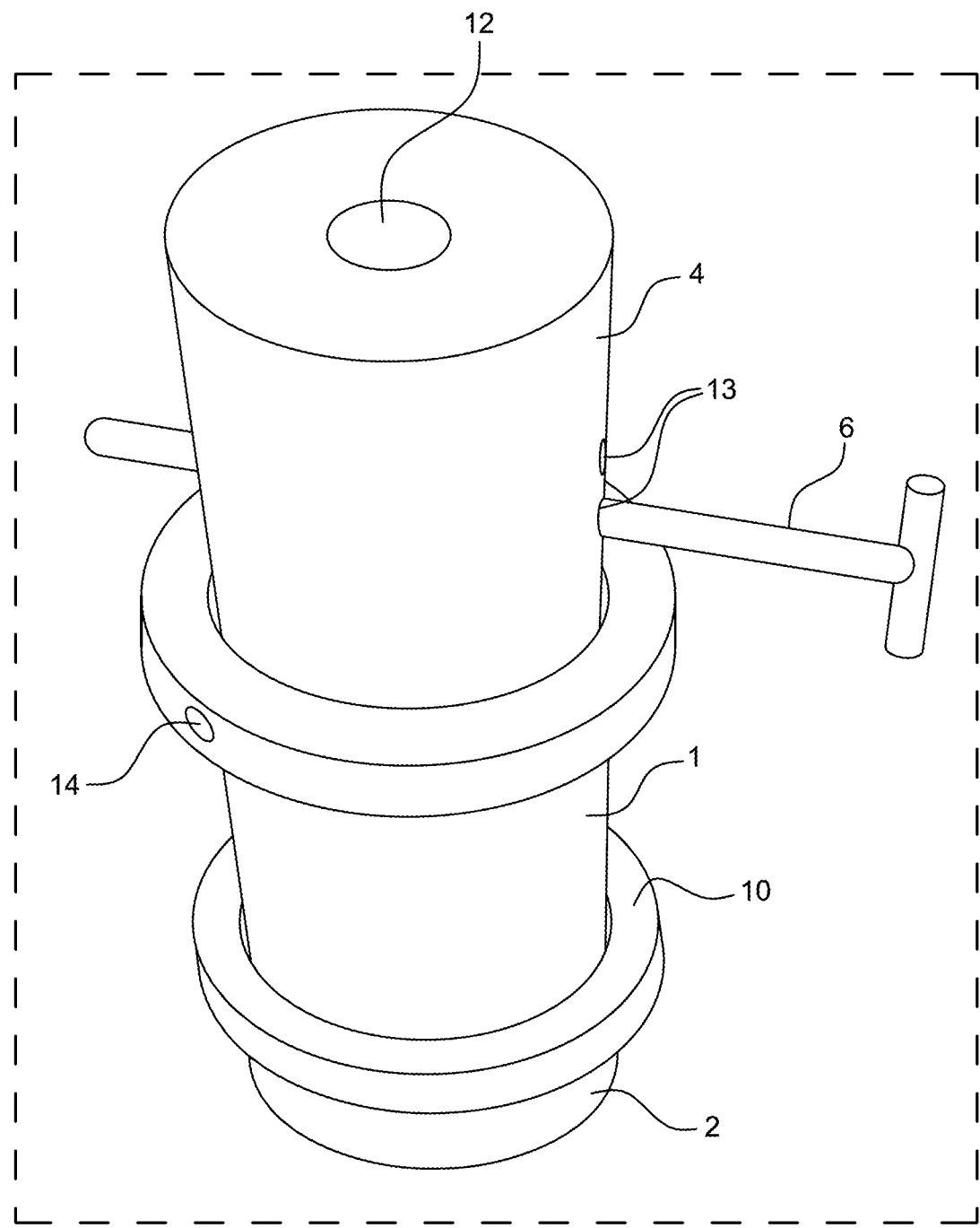
FIG. 13 shows an exemplary hemispherical recess in the top of an exemplary piston for single pellet crush testing.

FIG. 13 shows an exemplary hemispherical recess (12) in the top of an exemplary piston for single pellet crush testing.

Numerous modifications and variations of the present invention are possible in light of the above teachings. It is therefore to be understood that within the scope of the appended claims, the invention may be practiced otherwise than as specifically described herein.

REFERENCE SIGNS 1 upper sample holder, e.g., stainless steel
2 base holder, e.g., stainless steel
3 bottom holder, e.g., plastic/elastomeric film
4 piston, e.g., stainless steel
5 piston bottom, e.g., plastic/elastomeric film
6 locating pin, e.g., stainless steel
7 polymer sheet/film, e.g., PVA
8 undercut
9 rim
10 stabilizing ring
11 lip
12 recess, e.g., hemispherical
13 piston side hole(s)
14 upper sample holder side hole(s)
$a_1$ piston length
$a_2$ upper sample holder length
$a_3$ base holder length
$b_1$ upper sample holder flange length
$b_2$ base holder flange length
$d_1$ piston diameter/longest radial dimension
$d_2$ upper sample holder diameter/longest radial dimension
$d_3$ base holder diameter/longest radial dimension
$d_{12}$ recess diameter/longest radial dimension
L longitudinal axis, axial direction
R radial axis (360° about longitudinal axis)

The invention claimed is:

1. A bulk crush test cell suitable for a universal testing machine, the cell comprising:
    a base holder comprising a hollow internal bottom space, defined by an inner wall, an internal base wall, an external base wall, and an outer wall, an outer corpus of the base holder having a first longest radial dimension;
    a hollow upper sample holder comprising an inner upper sample holder wall and an outer upper sample holder wall, the upper sample holder being configured to rest in the hollowed internal bottom space, the upper sample holder being non-contiguous with the base holder, an outer corpus of the upper sample holder having a second longest radial dimension;
    a piston, comprising a piston top surface, a piston bottom surface, and a piston outer surface, the piston being insertable through the upper sample holder to thereby apply pressure to a sample within the cell, an outer corpus of the piston having a third longest radial dimension; and
    a locating pin configured to prevent the piston from contacting the base wall,
    wherein the first longest radial dimension is greater than the second longest radial dimension, the second longest radial dimension being greater than the third longest radial dimension,
    wherein the piston comprises a first radially oriented hole through which the locating pin is configured to pass from a first radial side of the piston to a second radial side of the piston,
    wherein the piston comprises a second radially oriented hole, suitable to receive the locating pin, through which the locating pin is configured to pass from the first radial side of the piston to the second radial side of the piston, the second radially oriented hole being longitudinally displaced along the piston from the first radially oriented hole, and wherein the base holder, the upper sample holder, and the piston are configured to hold together without further elements extending along a longitudinal axis between the base holder, the upper sample holder, and the piston.

2. The cell of claim 1, further comprising:
a first polymeric film arranged on the internal base wall of the base holder; and/or
a second polymeric film arranged on the piston bottom surface,
wherein the first polymeric film has a lower hardness than the internal base wall, and
wherein the second polymeric film has a lower hardness than the piston bottom surface.

3. The cell of claim 1, wherein the piston is slidably insertable into and removable from the upper sample holder, without rotating the piston, the upper sample holder, or the base holder.

4. The cell of claim 2, wherein the piston bottom surface is surrounded on a perimeter by a lip extending longitudinally further than the piston bottom surface coextensively with the piston outer surface,
wherein the lip is configured to retain the second polymeric film.

5. The cell of claim 1, wherein the second radially oriented hole is aligned linearly with the first radially oriented hole along the longitudinal axis of the piston.

6. The cell of claim 1, wherein the second radially oriented hole is aligned spirally with the first radially oriented hole along the longitudinal axis of the piston.

7. The cell of claim 1, further comprising:
a third radially oriented hole, suitable to receive the locating pin, through which the locating pin is configured to pass from the first radial side of the piston to the second radial side of the piston,
wherein the third radially oriented hole is longitudinally displaced along the piston from the first and second radially oriented hole.

8. The cell of claim 1, wherein the base holder comprises, on the inner wall, a radially inward protrusion configured to retain the first polymeric film against the internal base wall.

9. The cell of claim 8, wherein the radially inward protrusion is a contiguous element made of the same material as the inner wall of the base holder.

10. The cell of claim 8, wherein the radially inward protrusion has a constant cross-section orthogonal to the radial direction.

11. The cell of claim 8, wherein the radially inward protrusion has a constant cross-section orthogonal to the longitudinal axis.

12. The cell of claim 1, wherein the base holder, the upper sample holder, and the piston have circular cross-sections orthogonal to the longitudinal axis.

13. The cell of claim 1, wherein the base holder, the upper sample holder, and the piston have square cross-sections orthogonal to the longitudinal axis.

14. The cell of claim 1, wherein the base holder, the upper sample holder, and the piston have hexagonal cross-sections orthogonal to the longitudinal axis.

15. The cell of claim 1, wherein the piston has a cylindrical shape along an entire piston length.

16. The cell of claim 1, wherein the base holder and/or the upper sample holder comprises a flange, projecting radially outwardly, on an end towards the piston.

17. The cell of claim 1, wherein the third longest radial dimension and an inner diameter of the upper sample holder are in a range of from 35 to 100 mm, and
wherein the third longest radial dimension is less than the inner longest radial dimension of the upper sample holder.

18. The cell of claim 1, wherein the base holder, the upper sample holder, and the piston are each cylindrical in shape and configured to be concentrically aligned to each other in operation.

19. A method of opening a bulk crush test cell suitable for a universal testing machine, the method comprising:
without previously or thereafter releasing a fixing element on the cell, withdrawing a piston from within a hollow upper sample upper sample holder through a top portion of the upper sample holder, a lower portion of the upper sample holder resting within a base holder, to thereby directly expose a tested material within the upper sample holder and base holder,
wherein the piston comprises a piston top surface, a piston bottom surface, and a piston outer surface,
wherein the piston is configured for insertion through a top portion of a hollow upper sample upper sample holder and thereby apply pressure to a sample within the cell,
wherein the base holder comprises a hollowed internal bottom space, defined by an inner wall, an internal base wall, an external base wall, and an outer wall, and
wherein the upper sample holder comprises an inner upper sample holder wall and an outer upper sample holder wall, the upper sample holder being configured to rest in the hollowed internal bottom space, the upper sample holder being non-contiguous with the base holder.

20. The method of claim 19, wherein the base holder, the upper sample holder, and the piston are configured to hold together without further elements extending in an axial, longitudinal direction between the base holder, the upper sample holder, and the piston.

* * * * *